United States Patent [19]
Yokev et al.

[11] Patent Number: 5,546,422
[45] Date of Patent: Aug. 13, 1996

[54] METHOD OF TRANSMITTING LOW-POWER FREQUENCY HOPPED SPREAD SPECTRUM DATA

[75] Inventors: Hanoch Yokev, Ramat-Gan; Haim Harel, Herzelia; Yehouda Meiman, Rishon Letzian, all of Israel

[73] Assignee: Nexus 1994 Limited, London, United Kingdom

[21] Appl. No.: 362,114

[22] Filed: Dec. 22, 1994

Related U.S. Application Data

[60] Division of Ser. No. 158,441, Nov. 24, 1993, Pat. No. 5,430,759, which is a continuation-in-part of Ser. No. 961,776, Oct. 15, 1992, Pat. No. 5,335,246, which is a continuation-in-part of Ser. No. 932,610, Aug. 20, 1992, abandoned.

[51] Int. Cl.⁶ .................................................. H04B 1/713
[52] U.S. Cl. .................................................. 375/202
[58] Field of Search ................................... 375/200, 202

[56] References Cited

U.S. PATENT DOCUMENTS 5,193,101  3/1993  McDonald et al. .................. 375/202
5,425,049  6/1995  Dent ........................................ 375/202

Primary Examiner—Salvatore Cangialosi
Attorney, Agent, or Firm—Schwegman, Lundberg, Woessner & Kluth, P.A.

[57] ABSTRACT

An acknowledgement paging system is described which fits within the existing infrastructure of a paging network and which provides low cost manufacture and low power operation while still enabling the acknowledgement paging over long distances. The acknowledgement paging system consists of a standard paging transmitter and a plurality of remote paging units which respond to a page using frequency-hopped spread-spectrum differential bi-phase shift keying communications. The plurality of pagers are assigned to groups with each group being assigned a separate starting location in a common, repeating pseudo-random noise code which determines the frequency hops. The grouping of pagers minimizes the collisions of acknowledgment transmissions between groups and the enables a large number of paging units to operate within a single geographic area. The pagers include a special double loop PLL synthesizer to produce an accurate narrow band frequency and to change or hop frequencies in a rapid fashion. The base receiving unit employs special algorithms for retrieving very low power acknowledgement paging messages in a noisy environment by using data redundancy, data interleaving, soft decoding and error correction codes to strip the bi-phase-modulated, frequency-hopped spread-spectrum digital data transmitted from the remote pocket pagers. A history of the frequency and phase drift is used during reception of the acknowledgement messages to predict the phase and frequency drift of the encoded digital information to further reduce decoding error. Signal to noise ratios are determined for each frequency hop and relatively noisy hops are discarded or minimized in a soft decoding process based redundancy of data bits.

2 Claims, 19 Drawing Sheets

Microfiche Appendix Included
(1 Microfiche, 22 Pages)

METHOD OF TRANSMITTING LOW-POWER FREQUENCY HOPPED SPREAD SPECTRUM DATA

This application is a divisional of 08/158,441, filed Nov. 24, 1993, now U.S. Pat. No. 5,430,759; which is a continuation-in-part of 07/961,776, filed Oct. 15, 1992, now U.S. Pat. No. 5,335,246; which is a continuation-in-part of 07/932,610, filed Aug. 20, 1992, abandoned.

The present specification includes a microfiche appendix comprising two microfiche films containing high level programming instructions for the present invention. Appendix A is on a single microfiche film containing 21 frames and Appendix B is on a single microfiche film containing 22 frames.

FIELD OF THE INVENTION

The present invention relates generally to radio communication systems and in particular the present invention relates to two-way paging systems for acknowledgement of a paging message.

BACKGROUND OF THE INVENTION

Conventional one-way paging systems are well known in the art. Radio paging technology generally consists of simple tone pagers with a tone alert, a voice pagers with a voice message, numeric messages or an alphanumeric display pagers. In a typical paging system such as that shown in FIG. 1, a caller 10 places a call to a paging service provider at a paging terminal 12. The paging terminal queues up the messages to be sent to a number of remote paging units 14 via paging transmitter 13 which transmits a strong signal to the service area where all the remote pagers reside with enough power to reasonably reach all pagers within that market. Once the message is sent, there is no confirmation that it was ever received. The remote paging unit may be turned off, interference may have prevented reception, bad propagation conditions such as multipath, the unit may be out of the geographic service area, or any number of reasons may have prevented reception.

The messages transmitted from paging transmitter 13 to remote pager 14 generally use the POCSAG standard code for paging terminals. The POCSAG code includes a preamble, an address and a message for remote pager 14. The pagers within the geographic market area all receive the POCSAG codes on an assigned radio frequency and scan each message for the address assigned to the individual units. When the address (called a CAP code) is received, then the other information transmitted along with the code is recorded and displayed and the user is alerted.

In many markets, the single paging transmitter 13 is incapable of covering the entire geographic area of the local market. This may be due to the requirement of paging signal reception inside heavily constructed buildings, the fact that the antenna of a pocket receiver is inefficient and the proximity of the human body may affect field patterns for reception. In such cases, it is typical to find a paging communication system such as the system shown in FIG. 2. In this configuration, the caller calls through a PBX 15 through to the paging terminal 16 where the message is received and queued for transmission through VSAT 18 and uplink 19 to a geostationary satellite 20 for simultaneous retransmission (multicast) to a plurality of paging transmitter towers 13a, 13b and 13c. In this fashion, an entire geographic market can be serviced with the simultaneous transmission of the same paging messages over all transmission towers 13a–13c. The use of a geostationary satellite of course is not the only method of simultaneous transmission to the plurality of paging towers. Terrestrial links may also be employed.

A block diagram of a typical pocket paging unit such as the type used with the configurations of FIGS. 1 and 2 is shown in FIG. 3. This configuration is well known to those skilled in the art and includes a receiving antenna 21 driving a crystal controlled receiver 22 which down converts the received signal and strips out the digital data using an identification detector 24 to locate the CAP code address in the POCSAG data. If the address matches the receiver's address, an audible alert may be sounded through speaker 29. The microcontroller 26 is available in alphanumeric pagers to display the information received on LCD display 27. Associated with controlling the operation of the pager are one or more push buttons 28. The power unit is included which essentially powers the entire pager with very small NiCd or alkaline batteries.

An essential feature of these types of pocket remote paging units is the ability to operate the receiving circuits at a very low power so that the user need not change the NiCd or alkaline batteries on a too-frequent basis. One of the essential marketing advantages of the use of pocket pagers is the low maintenance and reliability such that the user need not worry about frequent changing of the batteries.

A major drawback in the use of the paging system of FIG. 1 is the inability of the caller 10 to have any confidence that the holder of remote pocket pager 14 has received the message and is responding. In such critical industries such as the medical field, or for maintenance and repair personnel, it is essential that the caller know that the called party has received the message and is responding in a timely fashion. Unfortunately with the systems of FIG. 1, there is no such acknowledgement to give the caller any confidence.

To address this problem, a variety of acknowledgement paging systems have been proposed whereby the paging unit 14 has a means of acknowledging the receipt of the message and even informing the user of a menu of possible responses to the caller's query. Typical of these types of systems is the system described in U.S. Pat. No. 4,644,341 to Zabarsky et al. entitled "Two Way Personal Message System With Extended Coverage" which describes a relatively high power, wideband personal messaging system. This system is typical of early messaging systems which were inefficient both in power usage and bandwidth thereby restricting their use to a relatively narrow market. A later attempt to extend personal two way messaging to voice pagers is taught in U.S. Pat. No. 4,811,379 to Grandfield entitled "Speak Back Paging System".

To alleviate the bandwidth and power limitations, more sophisticated two-way messaging systems have been proposed. Typical of these types of systems is the system described in U.S. Pat. No. 4,825,193 to Siwiak et al. entitled "Acknowledge Back Pager with Adaptive Variable Transmitter Output Power". In the Siwiak patent, an acknowledgement paging system is described in which the remote paging unit has the ability to send one of a selected number of messages from a menu back to the paging terminal to acknowledge the receipt of the message. This system is further described in U.S. Pat. Nos. 4,823,123, 4,875,038 and 4,891,637 also to Siwiak et al. See also U.S. Pat. No. 5,142,279.

The system of the Siwiak patents transmits the acknowledgement signal on one of a list of frequency subbands approximately centered around 150 megahertz. The transmitting paging terminal sends the message to the acknowledgement pager of the Siwiak system and also tells it which frequency of the list of sub-band frequencies upon which the acknowledgement pagers should respond. In this fashion, the paging terminal reserves one of the sub-band frequencies for that particular acknowledgement message. By allocating and re-allocating the sub-band frequencies, collisions between simultaneous-transmitting multiple remote paging units is minimized.

There is a need in the art for the ability to conserve power in reverse pagers and the Siwiak system attempts to ameliorate this problem with limited success. The users of acknowledgement pagers demand the same performance and reliability of the acknowledgement pocket pagers as they do from the one-way pocket paging units. The problem with acknowledgement pagers, however, is the ability to transmit enough power from the pager so that the acknowledgement signal is received at the paging base terminal site. As was previously mentioned, the transmitting power from the paging base transmitter 13 is sufficiently strong to reach most if not all of the geographic market. If enough transmit power is unavailable to reach the entire geographic market, a plurality of transmit towers are used such as that shown in FIG. 2. Due to the large geographic markets typically found for paging systems, it is difficult to transmit enough power from a handheld or pocket-sized acknowledgement paging unit for that acknowledgement message to be received at the paging terminal. Thus, to generate enough power, either larger batteries are needed or more frequent changing of the batteries will result. The Siwiak patent includes a variable transmit power option which conserves battery power by transmitting a low power signal when the signal strength of the received signal from the transmit tower has a high signal strength. This would indicate that the transmit tower, and its associated receiving tower to receive the acknowledgement message, is reasonably close. If, however, the power level of the transmit signal from the paging transmitter 13 received by the acknowledgement pager is weak, that would indicate that a higher power transmit signal from the acknowledgement pager of the Siwiak invention would be needed and the transmit power is boosted. This of course shortens the battery life of the system. Even with a minimal amount of acknowledgements sent back to the transmitting site, the batteries do not last as long in acknowledgement pagers as in the traditional pagers.

Another concern in the area of acknowledgement paging is the ability to asynchronously transmit acknowledgment signals. The Siwiak patents described above suffer from the need to be tightly coupled to the base station in terms of assigned frequency use and time of transmissions of the acknowledgment signals to avoid message collisions between simultaneously transmitting pagers. An attempt at pseudo-asynchronous behavior is described in U.S. Pat. No. 4,868,560 to Oliwa et al. entitled "Voice Paging System Providing Deferred Paging Capability".

Another concern in the area of acknowledgement paging is the cost of the pager itself. The ability to conserve power so that batteries do not have to be replaced as often causes great constraints on the components used for the construction of such pagers. Once again, the market expects a certain level of cost for a pocket paging unit and acclimating that market to higher cost pagers will cause market resistance to the penetration of acknowledgement pagers. Thus, a concomitant goal would be to provide an acknowledgment pocket pager at approximately the same cost as the one-way pocket pager while having the ability to maintain approximately the same battery life.

Another problem with market acceptance of acknowledgement pagers is the ability to adapt an acknowledgement paging system to the existing infrastructure of a one-way paging network. As shown above, the ability to transmit enough power from a pocket pager to be received at the sites of the existing paging transmitter towers is directly at odds with the ability to conserve battery power so that the batteries do not have to be changed as often. This tradeoff has not been met by the paging schemes proposed to date and thus market acceptance of acknowledgement paging is inhibited.

Also, due to the limited bandwidth for transmitting acknowledgement signals and the need for a large number of two-way pagers in a single market, there is a need in the art for the ability to simultaneously transmit from pagers and receive the acknowledgment signals without interference from simultaneous transmissions. An attempt to address such a need is found in U.S. Pat. No. 4,882,579 to Siwiak entitled "Code Division Multiplexed Acknowledge Back Paging System". The system described in this patent attempts to address this problem by using direct sequence spread spectrum data transmission within single frequencies. This system is still quite limited in the number of non-colliding acknowledgment messages it can handle, it is rigid in the time and frequency of acknowledgment transmissions (entirely synchronous transmit and receive protocol) and is inefficient in its bandwidth usage.

There is also a need in the art for automatic handling of outgoing messages and return receipt of the acknowledgement messages. U.S. Pat. No. 5,153,582 to Jasinski et al. entitled "Method of and Apparatus for Acknowledging and Answering A Paging Signal" attempts to provide a semi-automatic means but a human operator is still required to receive the paging information.

For the reasons stated above, and for other reasons stated below which will become apparent to those skilled in the art upon reading and understanding the present specification, there is a need in the art for a low-power, asynchronous reverse paging system adaptable to acknowledgement paging or polled response handling without collisions of simultaneous messages.

SUMMARY OF THE INVENTION

The above mentioned problems with acknowledgement paging and other problems are addressed by the present invention and which will be understood by reading and studying the following specification. An acknowledgement paging system is described which fits within the existing infrastructure of a paging network and which provides low cost manufacture and low power operation while still enabling the acknowledgement paging over long distances.

In particular, the present invention describes an acknowledgement paging system in which the remote paging unit responds to a request using frequency-hopped spread-spectrum differential bi-phase shift keying communications. A plurality of pagers are assigned to groups with each group being assigned a separate starting location in a common, repeating pseudo-random noise code which determines the frequency hops. The grouping of pagers minimizes the collisions of acknowledgment transmissions between groups and enables a large number of paging units to operate within a single geographic area. The pagers include a special double loop PLL synthesizer to produce accurate narrow frequencies and hop frequencies in a rapid fashion.

The present invention also describes algorithms for retrieving very low power acknowledgement paging messages in a noisy environment by using data redundancy, data interleaving, soft decoding and error correction codes to strip the bi-phase-modulated, frequency-hopped spread-spectrum digital data transmitted from the remote pocket pagers. A history of the frequency and phase drift is used during reception of the acknowledgement messages to predict the phase and frequency drift of the encoded digital information to further reduce decoding error. Signal to noise ratios are determined for each frequency hop and relatively noisy hops are discarded or minimized in a soft decoding process based redundancy of data bits.

BRIEF DESCRIPTION OF THE DRAWINGS

In the drawings, where like numerals refer to like components throughout the several views, FIG. 1 describes a prior art one-way paging system.

DETAILED DESCRIPTION OF THE PREFERRED EMBODIMENT

The specification for the present inventions described herein includes the present description, the drawings, claims and two appendices labeled Appendix A and Appendix B. In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

System Overview

Figure 4:
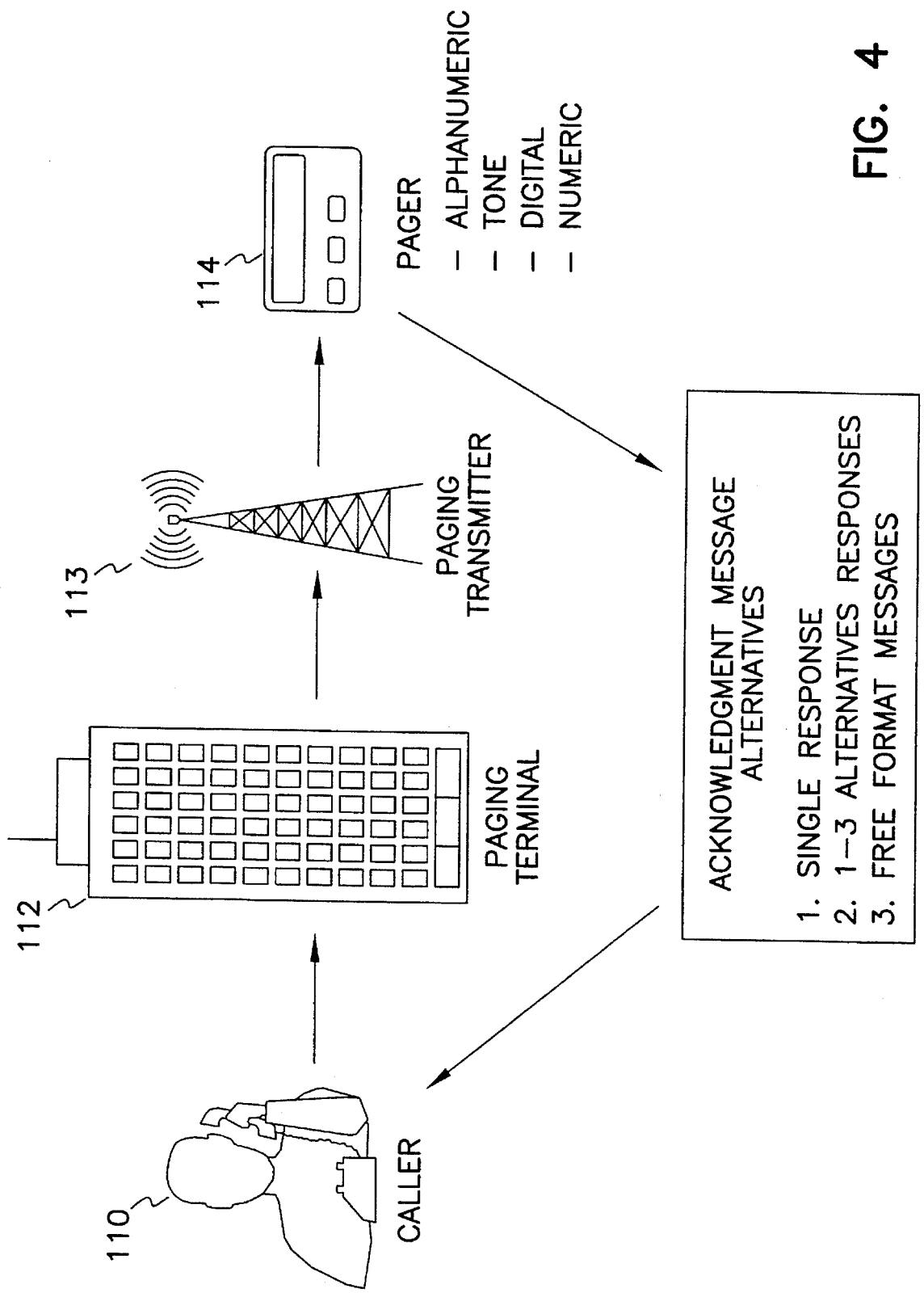
FIG. 4 is a high level block diagram of the acknowledgement or reverse paging system of the present invention.

FIG. 4 is a drawing depicting the acknowledgement paging system of the present invention. In the preferred embodiment of the present invention, the caller calls a paging terminal equipped with an acknowledgment paging system to contact a remote acknowledgment or reverse pager 114 as shown in FIG. 4. Paging terminal 112 receives the caller's message and queues the message with other messages to be transmitted by paging transmitter 113. The power of the transmission of paging transmitter 113 is approximately 200 Watts which is the same or similar to one-way paging systems but the radio paging signal contains additional information to support the acknowledgment paging system in the geographic market served. The reverse pager 114 receives the paging command and can respond back to the paging transmitter site using radio frequency transmissions through the paging terminal to return a message to caller 110.

In a preferred embodiment of the present invention, a single response may be returned to the caller via an automatic dialing system with prerecorded voice messaging. In an alternate embodiment of the present invention, choices among alternate responses could be made and the choice returned to the caller once again through an automated dialing and prerecorded voice messaging system. In a second alternate embodiment of the present invention, the reverse pager may be equipped with a keypad to allow free format messaging via a keypad such as that on a computer terminal in miniature pocket form. In a third alternate embodiment of the present invention, the reverse pager system allows direct pager to pager communication through the central paging terminal.

The preferred embodiments of the present invention are implemented in such a fashion as to take advantage of the existing infrastructure of an operational paging network. The additional hardware and computing power required to modify the paging terminal and paging transmitter is easily installed and implemented with very little impact on the existing system. In addition, the preferred embodiments of the present invention allow the operation of existing one-way pagers within the same network and environment as the present invention having two-way capability.

Total Automatic Operation

Figure 5:
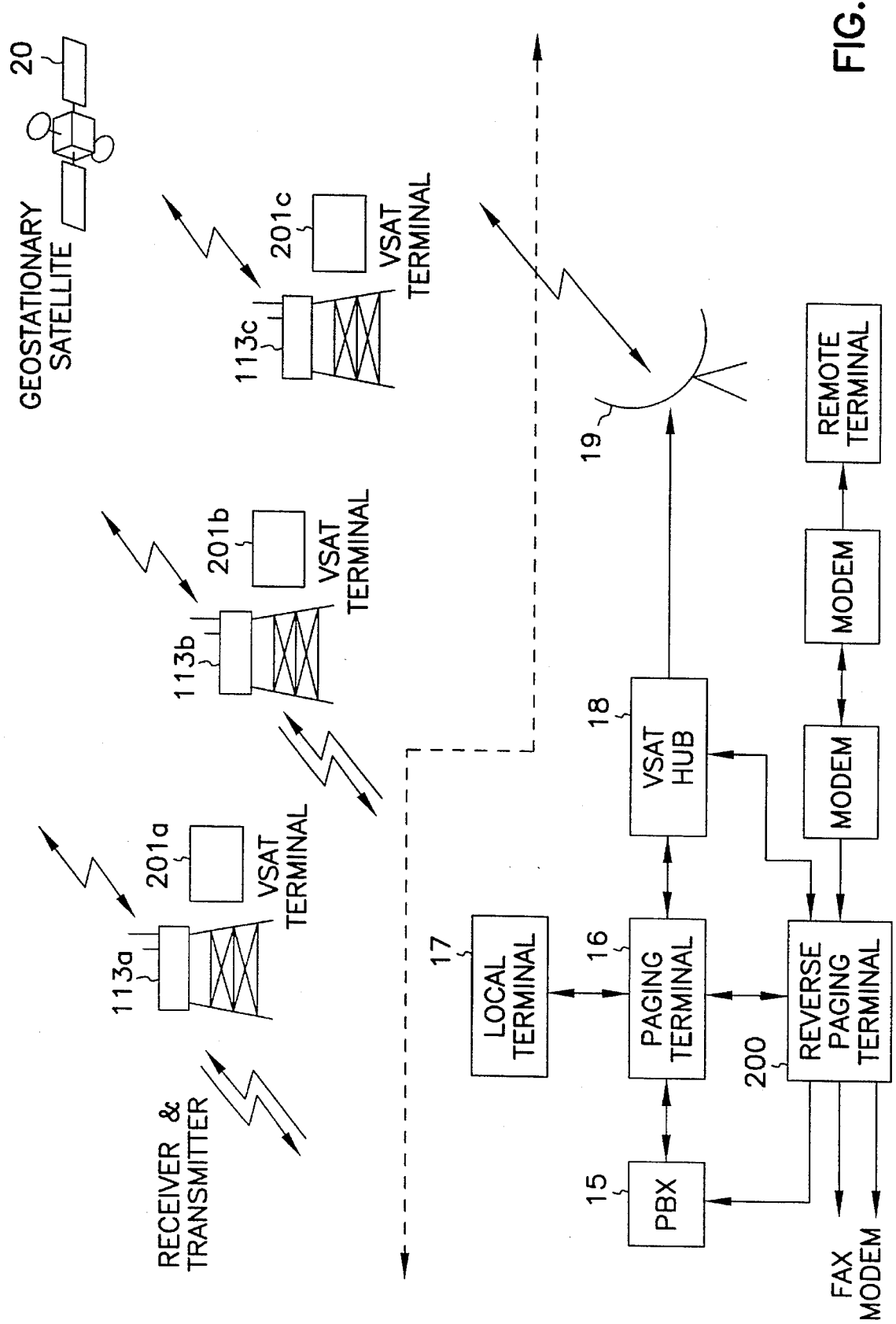
FIG. 5 is a detailed block diagram of the acknowledgement or reverse paging system of FIG. 4.

In the preferred embodiment of the present invention, the reverse paging system enables total automatic operation without human intervention. Referring to FIG. 5, a plurality of trunk lines through PBX 15 are provided to the standard paging terminal 16. Those skilled in the art will readily recognize that a DID line interface or POTS standard telephone interface could be used in place of the PBX connection. An interface is arranged between the PBX 15 and the reverse paging terminal 200 to allow the reverse paging terminal to return telephone calls in an automated fashion with prerecorded messaging to inform the caller that the remote paging acknowledgement had been received and, if applicable, a selection from a menu of choices was also received. This is a totally automatic operation without the need for any human operator or intervention. Reverse paging terminal 200 is connected through the existing paging terminal as shown in FIG. 5, for automatically calling and generating pre-recorded voice messages to the caller in response to the receipt of an acknowledgement signal.

In an alternative embodiment, the reverse paging terminal may be configured to service a plurality of independent paging service providers. Each paging service provider handles its own uplink at its assigned frequency, but the reverse paging downlink is managed by a single reverse paging terminal or a common set of reverse paging terminals. Since the downlink communications frequencies, power and protocol are separate from the uplinks, the plurality of independent paging services providers can be managed by a single reverse paging service provider.

Upon receipt of the acknowledgement message, the reverse paging terminal 200 generates a phone call back to the caller and a synthesized voice message is delivered. In an alternate embodiment of the present invention, a more sophisticated acknowledgement pager will send a message directly to a computer terminal via telephone modems. This embodiment is particularly useful in maintenance companies which have their own terminal for paging. In a second alternate embodiment of the present invention, the pager 114 is an alphanumeric pager with a keypad, a complete message is keyed in by the holder of the pager and a complete message is sent back to the base station.

Base Station Overview

FIG. 5 depicts the major components of the central office of a two-way paging system. In the preferred embodiment of the present invention, all of the components of the existing paging central office are maintained. In addition, hardware such as the reverse paging terminal 200 is added and adapted to the existing infrastructure. The reverse paging terminal operates to provide synchronization and messaging information through the paging terminal to the remote pagers via uplink 19 through geo-stationary satellite 20. Additional hardware at the transmit and receive towers 113a–113c are the VSAT terminals 201a–201c which are required for the accurate synchronization information needed to be transmitted to the remote pagers. This synchronization information, which will be described more fully below, is used to coordinate the response of messaging from the remote pagers so as to minimize collisions within groups of pagers and eliminate collisions between groups of pagers.

The reverse paging terminal 200 is adapted to interface with existing paging terminal equipment such as the Unipage™ paging terminal equipment manufactured by Unipage™ of Desoto, Tex. This is a rack-mounted, bus-structured paging terminal which allows expansion by plugging additional paging terminal boards into the backplane. This expandability is facilitated by using a protocol on the bus in which any one of the terminal cards can request and seize the bus to transmit its paging messages during a free time. Thus, by lowering the request line on the bus and lowering the busy line, an individual board may lock out other boards and seize control of the transmitter to transmit its particular messages. It is through this type of interface that allows the preferred embodiment of the present invention to be seamlessly integrated into existing paging equipment. By plugging an interface card into the Unipage™ backplane, the interface card to the reverse paging terminal 200 can seize the channel for transmitting synchronization information and control messages to reverse pocket pagers without appreciably impacting the existing operation of the Unipage™ terminal. Those skilled in the art will readily recognize that there are a wide variety of interface methods that may be used to interface the preferred embodiment to the present invention to other types of existing paging terminal equipment.

Base to Remote Synchronization

Figure 6:
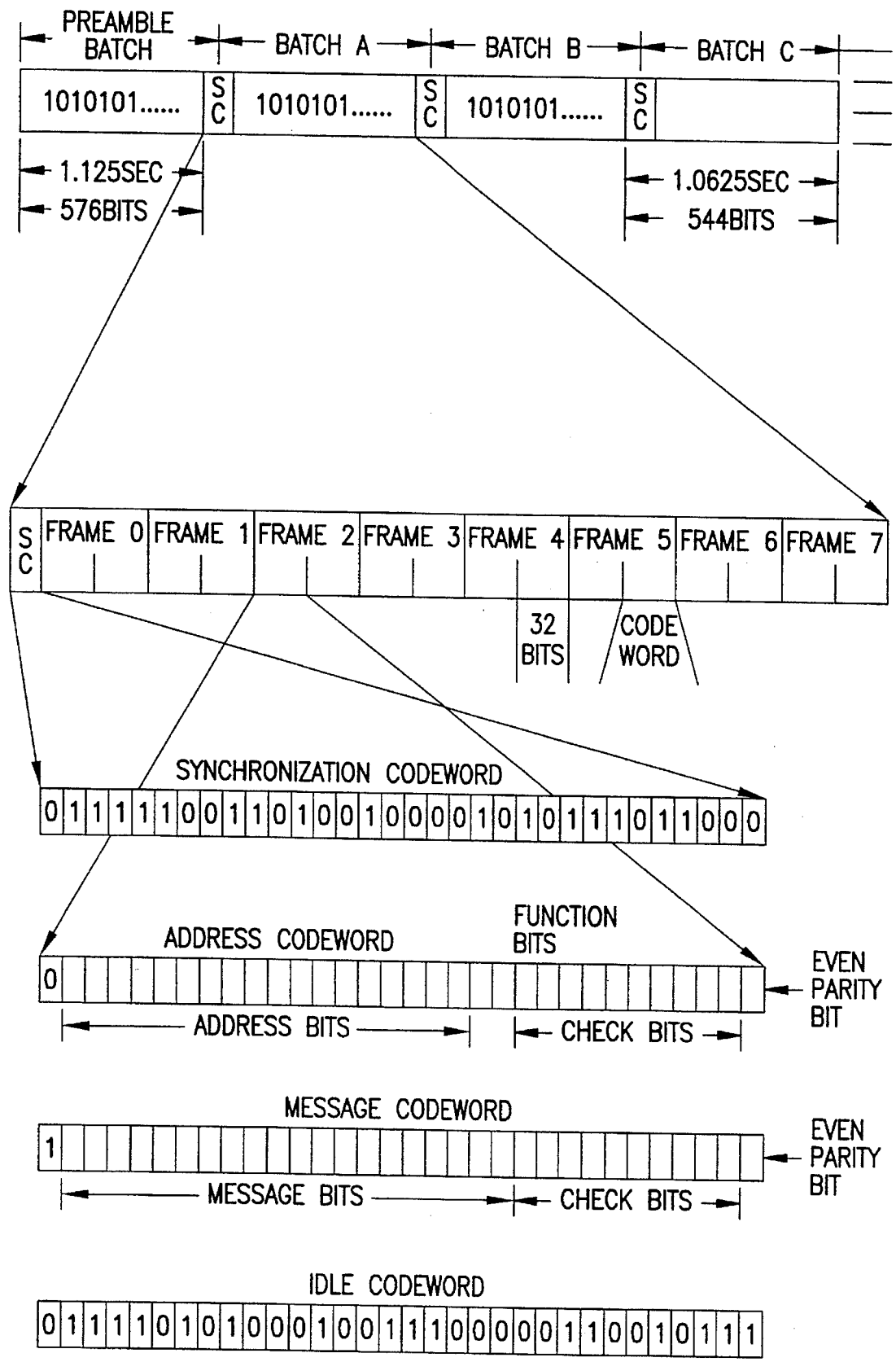
FIG. 6 is a detailed description of the modified POCSAG data format for transmitting synchronization information for the remote reverse pagers.

The messages sent to the reverse pagers 114 are, in the preferred embodiment, sent as digital data using the POCSAG standard. Typically the paging channel has a center frequency of 143.160 MHz, with an NRZ FSK data rate of 512 bps or 1200 bps. Other bit rates such as 2400 baud (bps) are also feasible. FIG. 6 describes the POCSAG paging communications protocol as modified for use by the preferred embodiments of the present invention. In the top line of FIG. 6, a greatly compressed time line of digital data transmitted according to the POCSAG protocol is shown. Batches of messages are transmitted in groups as shown in the details in the subsequent lines below the top line of FIG. 6. In the second line of FIG. 6, a 1.0625 second interval (for 512 baud) is shown in which 544 bits are transmitted as a single batch. The batch is preceded by a synchronization code word SC as shown in the third line of FIG. 6. This synchronization code word is used to get the attention of pagers in the geographic locale serviced by the paging terminal.

The synchronization code word within each batch is followed by eight frames of digital data. Each frame is divided into two portions, an address portion and a message portion. The address code word of the message of frame 2 of FIG. 6 is shown in line 4 while the message code word of the second half of frame 2 is shown in line 5. The address code word is preceded by a digital zero followed by 18 address bits, two function bits and 10 check bits. The address code word is followed by an even parity bit. The message code word portion of the frame is preceded by a digital one followed by 20 message bits which are followed by 10 check bits and a single even parity bit. Thus each frame is comprised of 64 bits divided into two 32 bit sections.

Synchronization of the base station terminal 200 and the reverse pagers 114 is necessary to ensure the pagers 114 are transmitting at the same time that-the base station 200 is listening. Synchronization is also necessary to coordinate the division of the large number of pagers into groups so that members of one group use different frequency hopping patterns from members of other groups. Synchronization of the remote reverse paging unit is accomplished by inserting a special frame into the POCSAG data which is used to synchronize the units, as described more fully below.

Synchronization between the reverse paging terminal and the remote reverse pagers is accomplished on two levels. Synchronization of the pagers within groups of pagers determine where along the pseudo random noise code the frequency hops are to be followed. For example, within a single group of pagers, all of the pagers within that group will be synchronized to begin transmitting at the same location in the pseudo random noise code list for any acknowledgement which may be required. Synchronization information is sent from the reverse paging terminal periodically to the addresses of each of the pagers within each group to remind the pagers where along the pseudo random noise code they should be tracking. This also enables the dynamic changing of a pagers group membership such that if one group is experiencing a large number of collisions due to simultaneous transmissions, the reverse paging terminal may re-allocate some of the pagers within that group to new groups to minimize collisions.

Another form of synchronization is required to synchronize the pagers to the exact times for transmitting frequencies from within any of the hops. This fine synchronization information, described more fully below, is transmitted as part of the POCSAG codes.

Referring once again to FIG. 6, eight frames of information are transmitted in each burst using the POCSAG format. Pagers may be assigned to a specific frame within the transmission so that the pagers, one recognizing the synchronization code word, can scan a specific frame for that pagers address. Once the address is found, the pagers can determine any group changes that may be required to reallocate that pager to a different group. In addition, the POCSAG format is used to transmit a fine time synchronization code. The fine synchronization code is a transmission of a time pulse at an exact time synchronized to a GPS (Global Positioning System) clock to synchronize all the remote pagers for time of transmission. For example, periodically during the day the reverse paging terminal will send a synchronization code within the POCSAG code word which is sent at a very precise time. In order to ensure that a precise time pulse is sent, the reverse paging terminal receives accurate time information using a GPS antenna to receive accurate time of day information. The time used to send the synchronization pulse is when the day clock reaches exactly some multiple of 0.9 seconds in the preferred embodiment. In this synchronization information, 20 bits of information are transmitted to give the accurate time of day information.

In each of the remote pagers, the microprocessor compares this accurate time pulse which will indicate the exact time of day and compare it to its own day clock. The clock within each microprocessor is accurate down to a few milliseconds, but the time at which the synchronization pulse occurs should have a resolution much finer than that such as down to 0.1 milliseconds for time of day. In this fashion, each of the microprocessors in each of the remote reverse paging devices can periodically realign its day clock to know within a millisecond the exact time. Each microprocessor does not actually realign its clock but changes a clock offset within memory so that it understands how far off its own internal clock is and can make the adjustment when using that clock to determine when to start transmitting information using the eight frequency hopped spread spectrum signal.

The synchronization pulse is only transmitted every few minutes. However, the resolution of the start of the message indicating the synchronization pulse is very accurate, it being transmitted at 0.090000 seconds GPS time after a fixed time of day, such as 12:00 GMT. This GPS time is accurate to at least within 100 nanoseconds. The GPS terminal is another card which is inserted into the Unipage™ terminal rack to provide the accurate time of day information to the reverse paging terminal 200 of FIG. 5. In order to ensure that the synchronization information is transmitted at the exact time needed by the reverse paging terminals to synchronize their internal clocks, the reverse paging terminal board inserted into the unit page rack must be able to grab the transmission bus and transmit at the required times. This would required that the reverse paging terminal have the highest priority use of the bus to ensure that it has access through the paging terminal 16 when needed.

The actual transmission of information from the reverse paging terminals is done using Differential Bi-Phase Shift Keying (DBPSK) modulation on a frequency hopped carrier. Typically a single transmission consists of 53 hops or 53 changed frequencies selected from a list of narrow band frequencies. The frequency selection is based on a pseudo-random noise code list pointing to the frequency selection list. The synchronization information tells the pager where along the pseudo random noise code it should be synchronized for transmission of its message and the fine synchronization information tells exactly the time of day so that the pager knows exactly when to start transmitting the specific frequency so that the reverse paging terminal 200 is looking for that frequency at the same time.

In operation, 200 frequencies are used and stored in a list numbered F1 through F200. For a specific message, 53 frequencies will be used to transmit the entire message. These 53 frequencies are selected based on a 1,000 member pseudo-random noise code. As will be described more fully below, short frequency hops are preferred over long frequency hops. That is, frequency changes are within a certain limited bandwidth are desired for ease of decoding at the reverse paging terminal. Long frequency hops, that is frequencies that have a large bandwidth between them, are not preferred but are still used. The use of short frequency hops allows the reverse paging terminal to segregate the available bandwidth and to simultaneously decode a plurality of frequency hopping transmissions simultaneously.

The use of the accurate synchronization signal periodically broadcast via the outbound paging signal enables the reverse paging units to use lower accuracy components thus saving the cost of the reverse paging unit for the end user. For example, high accuracy crystals to track the time of day within the microprocessor are available with an accuracy of three parts per million. Thus, a time drift of approximately three micro seconds per second or 180 microseconds in a minute is the known drift. There are also time inaccuracies which are introduced due to the time of transmission (variable path length) from the source from the reverse paging terminal when the synchronization information is sent. By employing crystals which are cheaper and have an accuracy of the order 50 parts per million, the amount of time-of-day drift normally wouldn't be tolerable. However, by using the synchronization information transmitted on a regular basis from the reverse paging terminal, the microprocessor can continually correct its own internal day clock so that accurate time of day measurements are always maintained. The microprocessor estimates the momentary inaccuracy of the crystal by tracking the drift across several synchronization transmissions and dynamically adjusts for the frequency drift of the crystal and the offset using internal offset registers for accurate time of day information.

Counters are employed within each microprocessor of the reverse paging units to compensate for the offset of the frequency based on the synchronization time information. There are generally two major factors which affect the drift in a crystal: temperature, acceleration. Most of the drift is due to temperature, and the remaining drift components are negligible. The frequency drift in a crystal due to temperature is very slow, on the order of 50 hz over 10 seconds. During a single day the temperature can change by 20 or 30 degrees fahrenheit, requiring a time update from the GPS clock approximately every five minutes.

Acknowledgement Message Format

The acknowledgement signal sent from the reverse pager 144 to the reverse paging terminal 200 of the base station is a spread-spectrum, frequency-hopped transmission using differential bi-phase shift keying (DBPSK) modulation on the frequency-hopped carrier to transmit digital information. The frequency hops are relatively slow, the frequencies transmitted are very narrow and the transmission power is extremely small. The maximum peak output power of transmission from pager 114 is limited to less than one watt to allow use of the 902–928 MHz band in the United States without the need for licensing the paging transmitters as allowed by FCC regulations defined in 47 C.F.R. §15.247, which is hereby incorporated by reference. Those skilled in the art will readily recognize that other frequency bands and transmissions power levels may be employed depending upon FCC licensing requirements or other frequency licensing requirements of other nationalities.

The use of an accurate crystal to control each frequency of transmission is required. For example, high accuracy crystals to transmit the narrow bandwidth frequencies used for the frequency hopped transmissions are available with an accuracy of three parts per million. At 900 MHz, a 3 ppm drift would place a single frequency somewhere within a 2.7 kHz band. To tolerate frequency drift due to aging and temperature, each individual frequency of the frequency hopped signal is allocated to a 7.5 kHz band or channel, even though the actual frequency is on the order of 50–100 Hz wide skirt within this 7.5 kHz allocated bandwidth. Those skilled in the art will readily recognize that by using alternate components, the frequency channels (individual frequency of the frequency hopped signals) of 7.5 kHz allocated bandwidth may be wider or more narrow depending upon the overall allocated bandwidth for the system. For example, 1 kHz or less bands may alternatively be allocated per channel.

Tests on this invention have shown that by using the combination of unique fast Fourier Transform algorithms of the present invention, as described below, to locate and retrieve the frequency hops and by using a combination of unique confidence algorithms with a plurality of error correction codes, the receiving reverse paging terminal 200 is able to pull the response information from a very low power signal from a distance of up to 45 kilometers (28 miles) in a flat terrain. In a rather noisy urban environment, a range of 24 kilometers (15 miles) is the norm.

In the preferred embodiment of the present invention, the acknowledgement message from pager 114 includes three parts of digital information. First is the pager ID or the CAP code of the pager. Second, the phone number in BCD to which the message should be delivered back. The phone number is sent with the paging information from the base station and it is sent back to the base station for verification such that pager 114 operates as a talk-back pager. The third part of information sent back to the base station is the type of message which is going to be delivered to the caller, which is typically a menu choice.

As shown in Table 1, the acknowledgment message format consists of a preamble and the message body spanning a total of 53 frequency hops. Those skilled in the art will readily recognize that longer messages may be transmitted using the preferred embodiment of the present invention, and the messages format described here is illustrative but not limiting. Since FCC regulations defined in 47 C.F.R. §16.247 require a minimum of 50 frequency hops, the 53 hop message format described here is considered a short message hop. Much longer message hops to transfer more digital data is also implemented but not described here. Of course, those skilled in the art will readily recognize that shorter messages than those described below are equally possible for the preferred embodiments of the present invention. The message length and number of transmission hops are a matter of design choice.

The message preamble consists only of alternating ones and zeros to get the attention of the base unit receiver to begin synchronizing its FFT (Fast Fourier Transform) routines to begin pulling the message out of the noise. The preamble consists of 165 bits transmitted across 5 hops, that is, transmitted using DBPSK (Differential Bi-Phase Shift Keying) on five different frequencies selected from the frequency list with the specific frequencies selected based on the PN (Pseudorandom Noise) Code list stored within the reverse pager. The sequence location within the PN code that the reverse pager will begin to follow is based on the synchronized time of day. Within a single hop (a single carrier frequency), the carrier phase is alternated 33 times to encode the alternating one-zero pattern.

The message body follows the preamble and consists of three groups of data. Each group consists of 30 actual data bits so that the entire message is, in the preferred embodiment of the present invention, 90 total data bits (although other bit length messages may be chosen). The actual data encoded within these 90 bits is described above and may be in any convenient coded format. Those skilled in the art will readily recognize that a wide variety of message formats and encoding of the data bits may be used without departing from the spirit and scope of the present invention. The encoding described here, however, has been proven effective in retrieving the data bits buried in background noise with a high degree of accuracy and a low actual error rate.

TABLE 1

Message Acknowledgement Format

Preamble is 165 bits (33 bits × 5 hops)
Message is 512 transmitted bits
(Message is 90 bits actual data)

 = One Frequency Hop

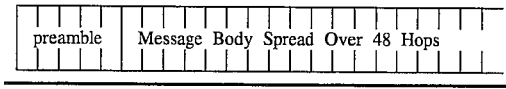

preamble | Message Body Spread Over 48 Hops

Outer Message Coding

Each of the three groups of message data (30 bits each) are BCH encoded using a standard 30,63 BCH code and with a single parity bit added to form a 64-bit word. This encoding decreases the error rate from $10^{-2}$ to $10^{-5}$. This encoding, documented and understood by those skilled in the art, can correct up to 6 errors or detect up to 13 errors. Detection of corruption of a data word that cannot be reconstructed will cause the base to request a second transmission of the acknowledgement message.

Inner Coding and Interleaving

The inner coding of the message will protect the integrity of the message with an error rate as high as 25%. Each block of 64 bits of data (corresponding to a groups of 30 bits and earlier encoded by a standard 30,63 BCH code) is split into two sub-blocks of 32 bits (sub-blocks A and B of Table 2), and a reference bit is added to each sub-block to assist the differential encoding to provide a reference bit to the DBPSK decoder. The 33 bit sub-blocks are transmitted over one frequency hop each and are replicated times so that the 64-bit block traverses 16 frequency 8 hops. In transmission, the 33 bit sub-blocks are interleaved to further reduce loss of data, as shown in Table 3, where sub-blocks A and B of Table 2 correspond to the first group of 30 bits, sub-blocks C and D, correspond to the second group of 30 bits, etc. The total message is 53 hops where each hop is 180 msec in length making the duration of a single message 9.54 seconds.

TABLE 2

Interleaving Format for Sub-block

A = 1 reference bit and 32 data bits = 33 bits
B = 1 reference bit and 32 data bits = 33 bits
 = One Frequency Hop

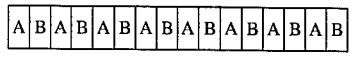

TABLE 3

Inner Coding and Interleaving of Sub-blocks

A = first 33 bits of 1st block
B = second 33 bits of 1st block
C = first 33 bits of 2nd block
D = second 33 bits of 2nd block
E = first 33 bits of 3rd block
F = second 33 bits of 3rd block
 = One Frequency Hop

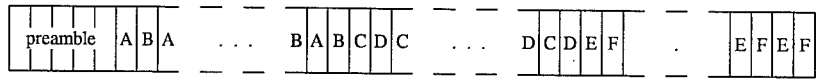

Those skilled in the art will readily recognize that a wide variety of data interleaving may be utilized to effect better error tolerance and may be substituted for the interleaving described here. Such alternate substitute interleaving means are CIRC (Cross Interleaved Reed Solomon Code) used in CD (Compact Disc) recording media operating either at the block level or at the bit level.

Single Hop Format

The acknowledgment signals are transmitted by the reverse pagers 114 in a 1.5 MHz band selected from within the 902–928 MHz spectrum. The 1.5 Mhz band is divided into 7.5 kHz channels to provide 200 channels available in which the frequency hops can occur. Thus, each frequency hop is a channel 7.5 kHz wide in which a carrier frequency is transmitted. For example, channel one will have a frequency F1 at 902.000000 Mhz +/–3.25 kHz, channel two will have its center carrier frequency at 902.007500 Mhz +/–3 khz, etc.

Each transmit frequency of each hop will thus be centered at the approximate mid-point of the assigned channel band; however, due to inaccuracies in the reverse pager circuits and reference crystals, the actual transmit frequencies will vary between units. If high quality crystals are used to accurately produce the required frequencies, very little drift off the center frequency will result. In the preferred embodiment of the present invention, low cost crystals are purposely employed to keep the per-unit manufacturing costs down. This will allow for a lower-cost product sold to the user which will increase market penetration. Thus, reference crystals are preferred which have a frequency accuracy of 3 ppm such that at 900 MHz, the statistical drift would be approximately 2700 Hz. The crystals center frequency within its nominal accuracy also drifts due to aging and temperature variations, but this drift is slow compared to the transmission times so the drift during a single transmission due to these latter variants is unimportant.

A single frequency hop is shown in Table 3. The 15 millisecond guard time preceding each hop is primarily a settling time for the oscillator circuits of the reverse pagers to allow the internal oscillator circuit to lock onto the new frequency between hops. Each hop is transmitted at a single frequency in which the phase of the carrier is either at 0 degrees phase or 180 degrees phase in reference to the phase of the reference bit immediately following the quiet or guard time. Thus the first bit is a phase reference bit followed by 32 data bits exhibiting either zero phase shift or 180 degree phase shift to encode the data bits as DBPSK (Differential Bi-Phase Shift Keying).

Each bit of DBPSK is a transmission of approximately 5 milliseconds of the hop carrier frequency either in phase with the reference bit transmission or 180 degrees out of phase. Each actual bit is approximately 4.7 milliseconds of carrier at the hop frequency preceded and followed by approximately 0.15 milliseconds of quiet guard band to reduce discontinuities between phase changes which contribute to step-function noise in the transmission.

TABLE 3

Single Frequency Hop Format

Guard time (quiet) = 15 ms
Single Bit = 5 ms of carrier DBPSK
33 Bits plus guard time = 180 ms

| 15 ms Guard Time | 5 ms Ref Bit | 5 ms 1st Bit | 5 ms 2nd Bit | 5 ms 3rd Bit | — — — | 5 ms 31st Bit | 5 ms 32nd Bit |
|---|---|---|---|---|---|---|---|

Frequency Hopping Sequence

All of the reverse pagers in the market serviced by the reverse paging terminal use the same pseudo random noise code to determine the frequency hops. The pseudo random noise code is a digital code which is repeating after approximately 1,000 unique codes. In the preferred embodiment of the present invention, the pseudo random noise code is stored in memory of each of the pagers. Those skilled in the art will readily recognize, however, that a linear feedback shift register could be used to generate the pseudo random noise code on a real-time basis instead of using a look-up table which is presently in the preferred embodiment.

The PN (pseudo-random noise) code list is stored in memory and maps to a frequency list. In the preferred embodiment of the present invention, the PN code list has 1,000 entries which repeat as a sequence. The control means of the reverse paging units continuously maintain a count of the proper location within this list for the exact time of day. As described below, the time of day for all pagers in the market served by the base terminal are periodically synchronized to ensure acknowledgment messages are synchronized to transmit the hop frequency at the proper time and to synchronize the location within the PN code list that each pager will use to transmit.

The 1,000 member PN code list maps to a 200 member frequency list. In order to allow a large number of reverse pagers to simultaneously operate in the same geographic market, the pagers are divided into groups and the groups are assigned different sequence segment locations in the same 1,000 member PN list. Thus a pager from group one will begin transmitting a hop at a frequency determined from a first location with the PN code, while a pager from group two may begin transmitting a hop at a frequency determined from a second location in the PN code. The pagers from group one and group two will complete their respective acknowledgement messages in 53 hops. Preferably, the sequence of the PN code used to determine the frequencies of the 53 hops for the pager of the first group will not overlap the sequence of the PN code used to determine the frequencies of the 53 hops for the pager of the second group. More preferable, the frequencies chosen based on the non-overlapping segments of the PN code list are orthogonal such that the same frequency is never used by two pagers belonging to different groups.

In the preferred implementation, the 1,000 member PN code list is divided into 160 hopping sequences. The remote paging units are divided into 40 groups with the members of each group synchronized to track the same location in the PN code list. The microcontroller of each pager, regardless of its group membership, continuously runs through the repeating PN code sequence to stay in synchronization with the base unit and all other pagers. Each group of pagers is further divided into four subgroups such that the pagers within each subgroup are assigned one sequence within the PN code list. Although the 53 hop sequence needed for each acknowledgement transmission may overlap the 53 hop sequence used by a pager in another subgroup, the transmission sequences of a pager of one group is chosen to not overlap the 53 hop sequence used by a pager in another group.

Base Station Design

Figure 7:
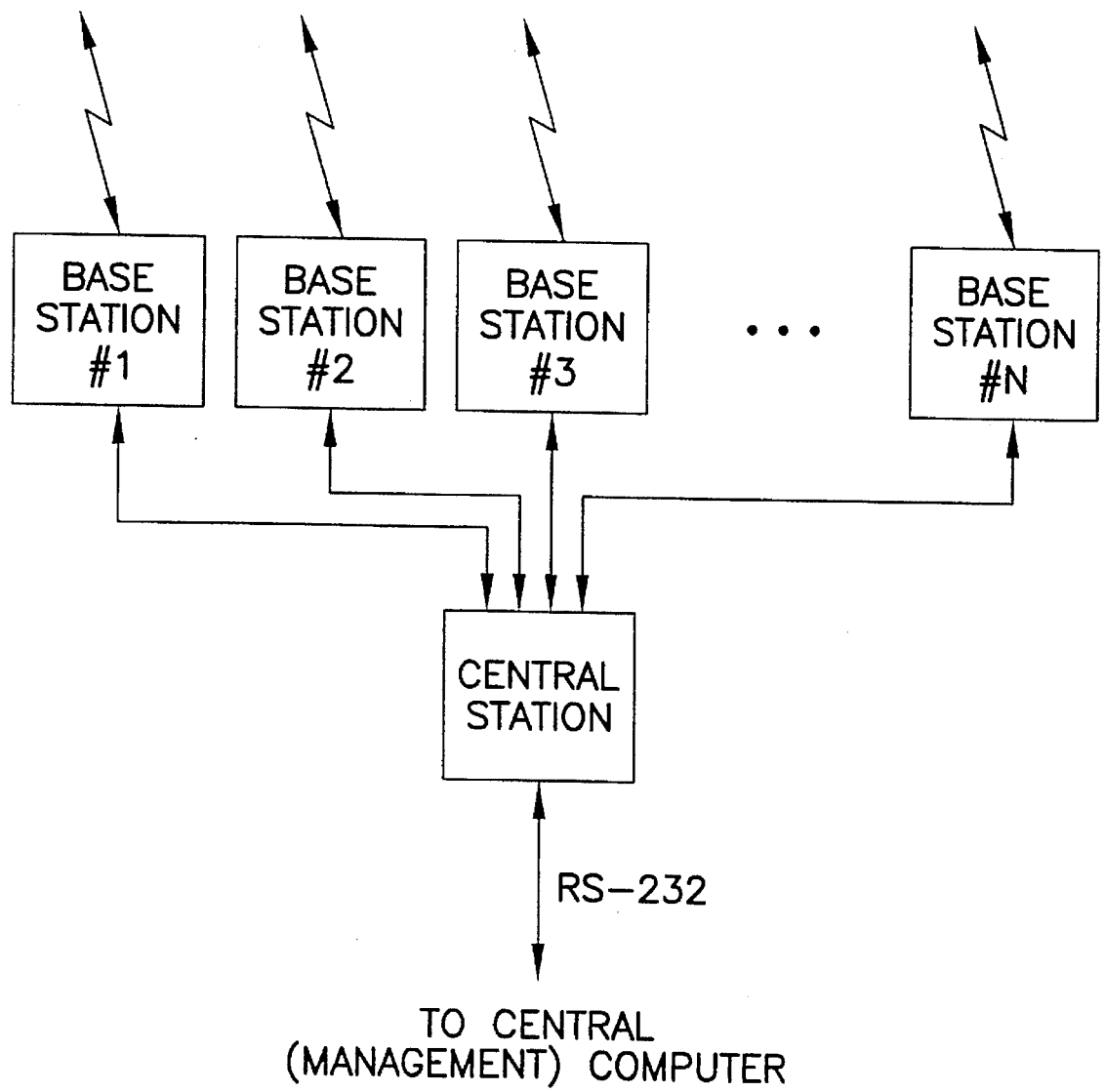
FIG. 7 is a high level block diagram of the use of a plurality of base stations for the present invention.

Referring once again to FIG. 5, the two-way paging system consists of a central station transmitting via multiple transmit towers 113A–113C located throughout the geographic market served. In the preferred embodiment of the present invention, the paging system consists of a single central station and several base stations located throughout the region as shown in FIG. 7. The outbound communication shown in FIG. 5 will be performed via the existing paging system infrastructure. In operation, an outgoing page will consist of a call placed to the central station. An operator at the central station will type the message on a management computer work station or the call may be automatically handled by automatic answering machines. The message will be sent via local terminal 17 to the paging terminal 16 through an asynchronous communication line, through the VSAT hub 18 and then be transmitted simultaneously through antennas 113A–113C.

The inbound leg, that is, the acknowledgment paging signal from the reverse pagers, will be received by one of the plurality of base stations shown in FIG. 7. The received message will be down converted, demodulated and error corrected. The messages are then transferred to the central computer with the time of arrival, the pager ID and the destination through the VSAT lines. The central station can then transfer the messages to a central management computer via RS 232 port for return of the acknowledgment to the caller. The acknowledgment may consist of automatically dialing the caller with a voice synthesized acknowledgment. The system would also be capable of sending prerecorded messages. Acknowledgment may also be made through a modem to another computer, an acknowledgment via fax, pager to pager acknowledgment or paging or message acknowledgments to external terminals. Those skilled in the art will readily recognized that a wide variety of acknowledgment formats may be effected without human intervention.

The central station computer may consist of a network of IBM PC compatible computers to handle communication and sorting of messages from the plurality of base stations. The messages are correlated to ensure that plural reception of a single message by a number of base stations is performed to eliminate duplicate reception of messages.

Each of the base stations shown in FIG. 7 consist of equipment that is installed externally and operating automatically on each of the transmit towers. The equipment installed for the base station on each tower consist of RF box and several antennas. A paging omni antenna is of course the existing multiple dipole transmit antenna. A GPS Antennae is included to receive the accurate time of day needed for synchronization of paging messages. A reverse paging omni antenna is also installed to receive the reverse paging messages as shown in FIG. 8.

Figure 8:
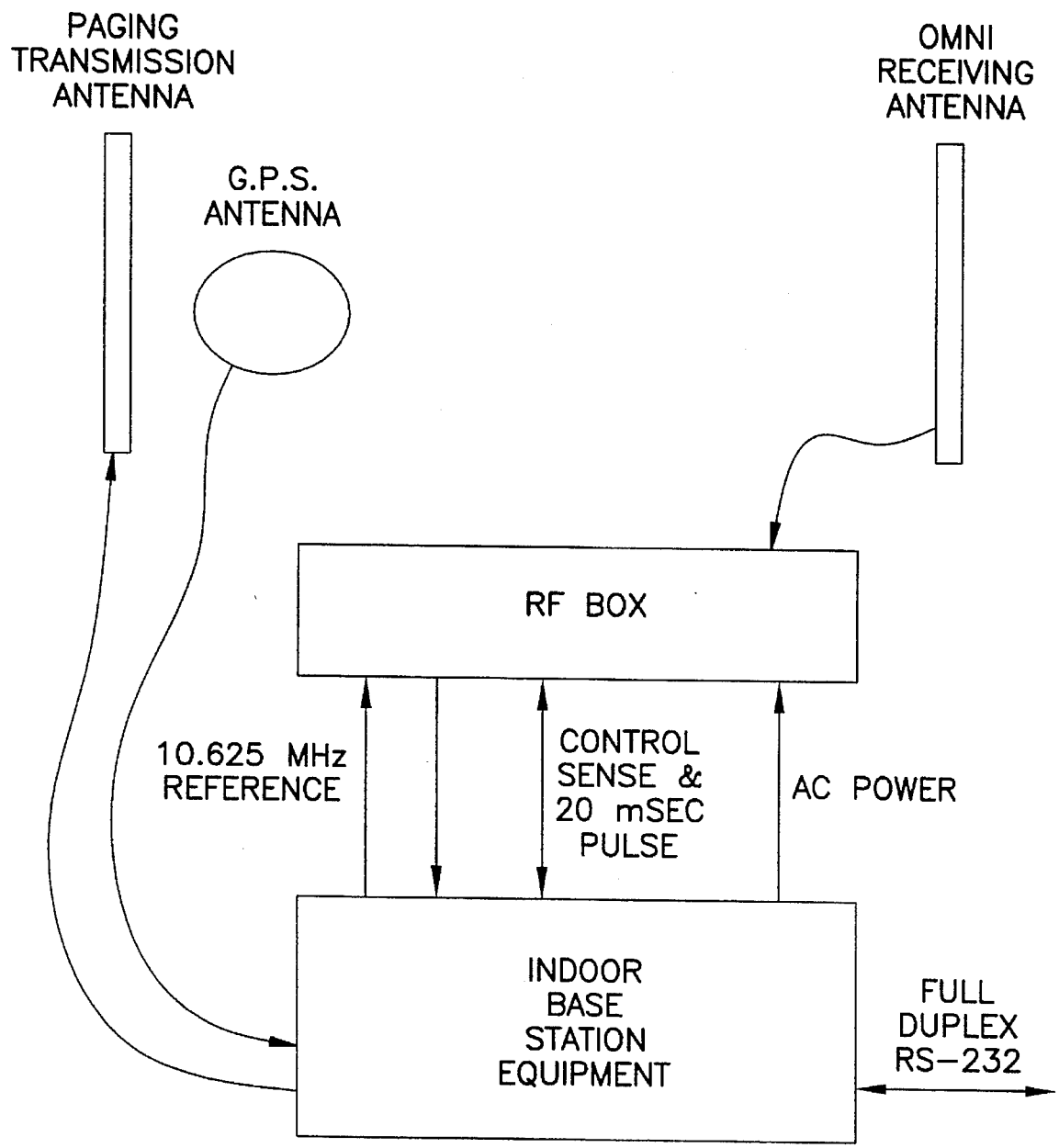
FIG. 8 is a high level block diagram of one base station of FIG. 7.

The RF box of FIG. 8 filters the incoming signal to within a bandwidth 1.5 MHz. The radio frequency reverse paging signals are then converted to an intermediate frequency (IF) of 70 MHz. The conversion to IF is done in order to avoid sensitivity lost due to the long cabling connecting indoor equipment to the RF equipment as shown in FIG. 8. Losses at 900 MHz over long cable runs are therefore avoided.

Figure 9:
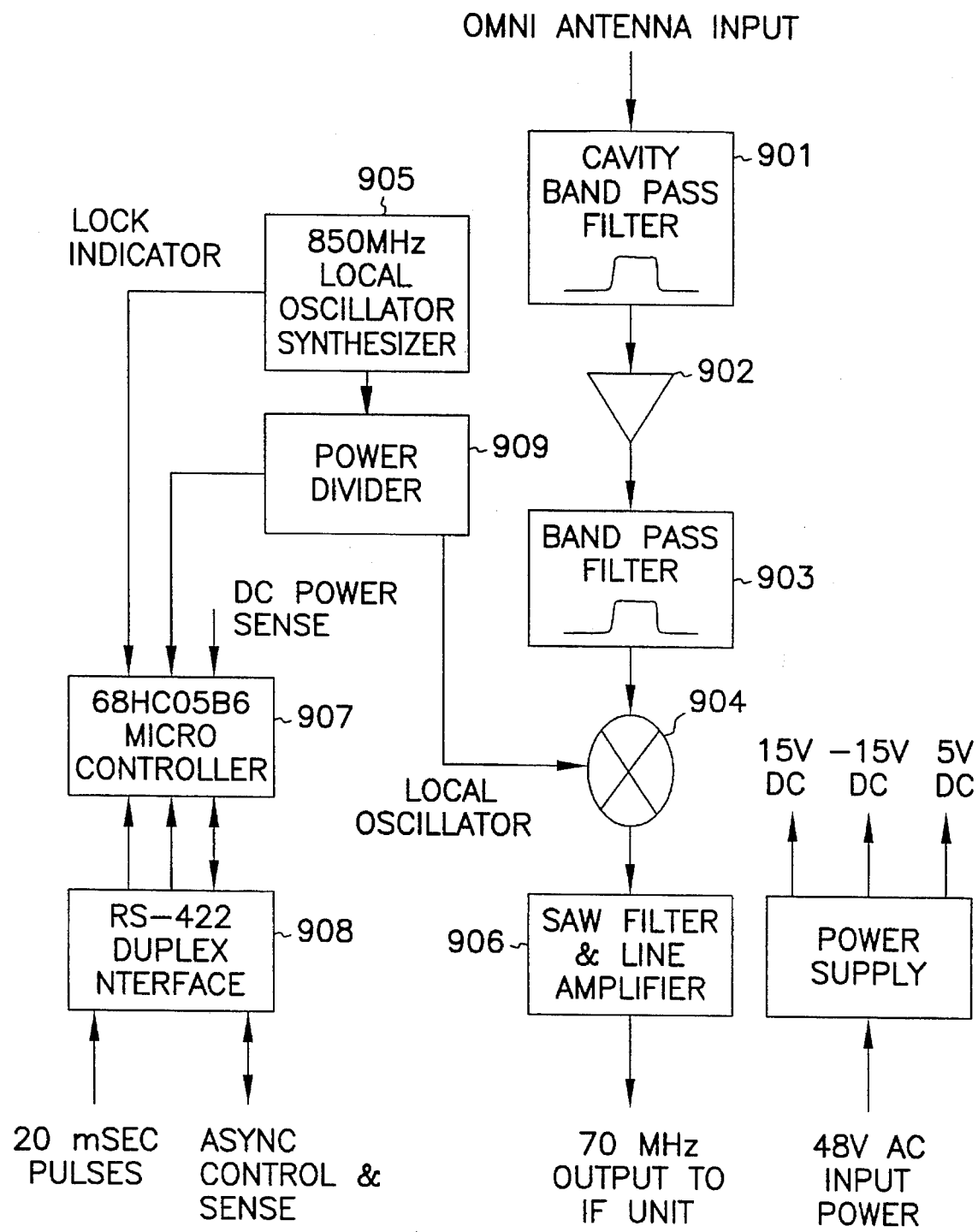
FIG. 9 is a detailed block diagram of the RF box of FIG. 8.

The RF subsystem for the RF box of FIG. 8 is shown in FIG. 9. The RF box converts the 900 MHz band signals into a 70 MHz IF frequency. The RF chain of FIG. 9 starts with a cavity bandpass filter 901 that suppresses out-of-band interference. A bandwidth of this filter is selected in the preferred embodiment to be 2 MHz. A LNA (Low Noise Amplifier) 902 operating in the 900 MHz band with a noise temperature below 80 degrees Kelvin is used to amplify the incoming signal. The amplified signal from LNA 901 is passed to a helical bandpass filter 903 to cancel the image frequency noise. The filtered and amplified RF is down converted to a 70 MHz IF frequency using a 17 dbm local oscillator mixer in order to preserve the system's dynamic range. The local oscillator operates at 850 MHz locked to a reference of 10.625 MHz. The 70 MHz IF frequency is amplified and filtered by a SAW filter 906 with a bandwidth of 1.5 MHz.

Microcontroller 907 receives command and control information through the RS-422 duplex interface from the indoor base station equipment shown in FIG. 8. This duplex interface is a synchronous interface clocked to 20 millisecond pulses. To minimize command and control line interference from the indoor equipment to the RF box, all digital lines are differential according to the RS-422 standard. The microcontroller is used to check status of the operation of the RF box such as synthesizer lock, DC power levels and amplifier status. The RF box is powered by 48 volt AC which is locally converted to the operating voltages required.

Figure 10:
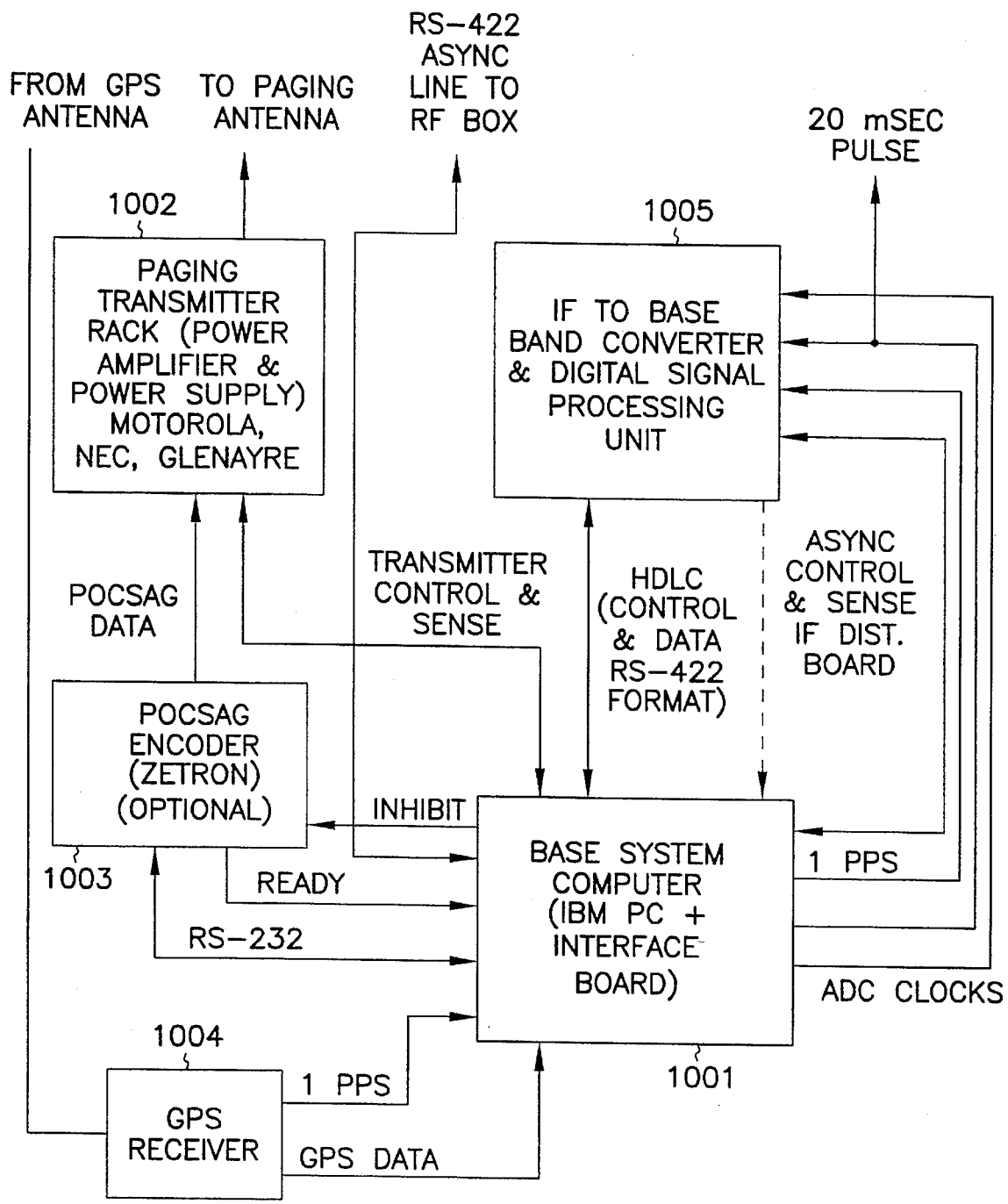
FIG. 10 is a block diagram of the base station equipment of FIG. 8.

The 70 MHz output is transferred to the base station indoor equipment as shown in FIG. 10. The base station indoor equipment consists of a complex of six units operating under control of a base system computer 1001 which in the preferred embodiment of the present invention is implemented as IBM PC compatible computer with an interface board to control the other four components of the local base station. The paging transmitter rack 1002 is generally implemented using standard paging transmitter equipment such as that manufactured by Unipage™, Motorola NEC, etc. The POCSAG encoder 1003 is also available in the industry and is manufactured by Zetron. The POCSAG encoder at the base station is redundant if the delays of the communication lines between the base station 1001 and the central paging terminal 16 are known. The encoding is then done at the paging terminal. Base station computer 1001 synchronizes the accurate transmit of the POCSAG data by using an inhibit line until the timing is correct based on GPS time.

A GPS Receiver 1004 is used to receive extremely accurate time of day and to create one pulse per second reference clock which is then used by base station computer 1001 to transmit via POCSAG encoder 1003 the accurate synchronization messages required for synchronizing the remote paging units.

The IF to base band convert 1005 contains signal decoding, demodulating and DSP (Digital Signal Processing) circuitry. This unit receives the 70 MHz IF signals from the RF box, demodulates the signal to baseband, strips the digital data from the analog signal and translates the data into decoded messages. The decoded messages are passed to the base station computer 1001 via RS-422 synchronous communication line. To ensure accurate synchronization of information received by the IF to base band converter 1005, a 9.6 MHz reference signal is received from base station computer 1001. Base station computer also supplies the A/D (analog to digital) conversion clock signals needed to demodulate the signals.

IF to Baseband Converter and DSP Unit

Figure 11:
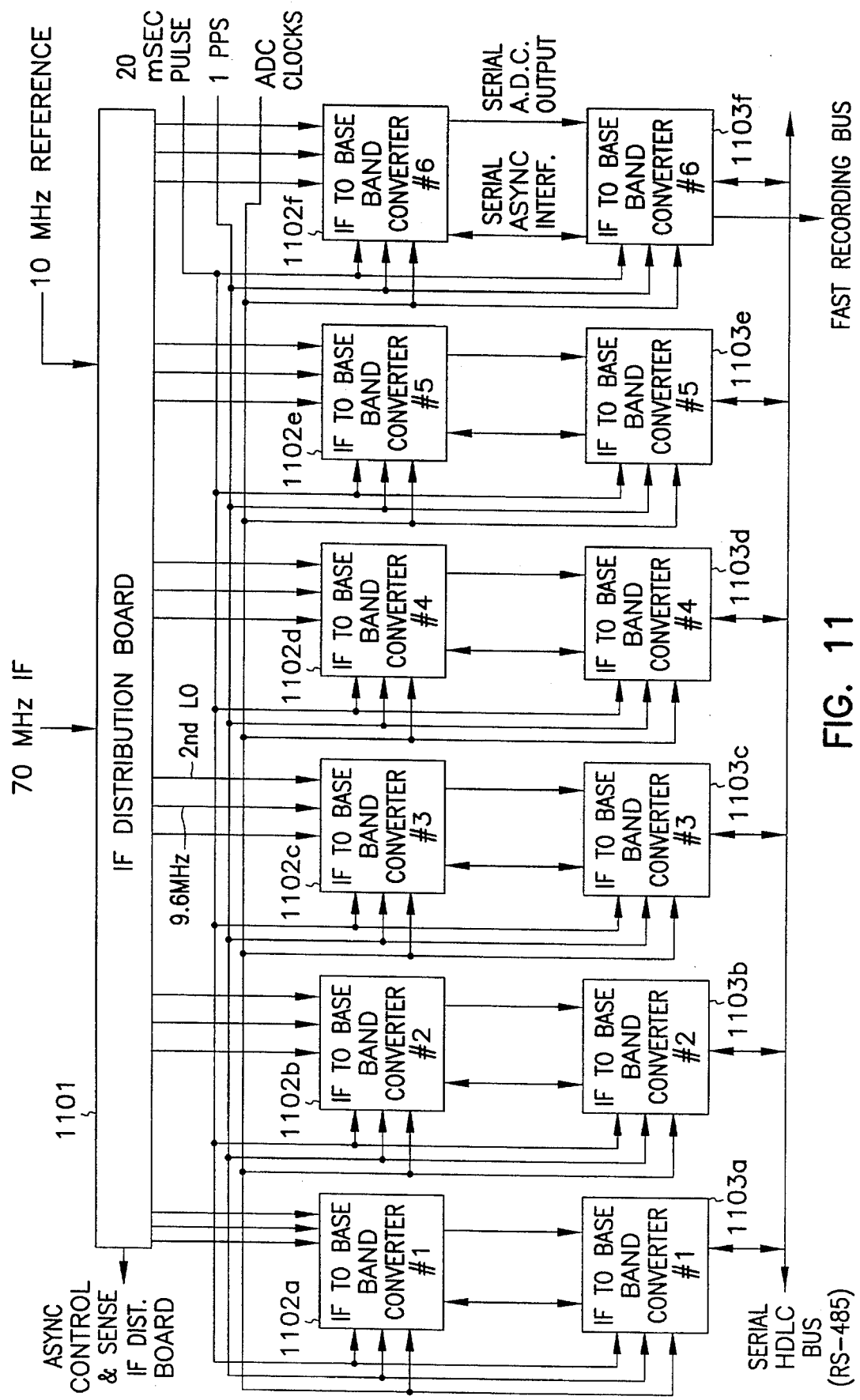
FIG. 11 is a detailed block diagram of the IF to Baseband Converter and Digital Signal Processing Unit of FIG. 10.

The IF to baseband converter and digital signal processing unit 1005 is shown in a detailed blocked diagram in FIG. 11. The 70 MHz IF down converted signal is inputted to the IF distribution board 1101. The IF distribution board is a power divider to take the 70 MHz IF and distribute it to a plurality of parallel converter and DSP pipelines. In the preferred embodiment of the present invention, six parallel pipelines for simultaneous down converting and message decoding are implemented. Those skilled in the art will readily recognize that as the volume of massaging traffic increases, additional parallel pipelines maybe added to increase the throughput of this system without departing from the spirit and scope of the present invention. In particular, the IF distribution board 1101 can be daisy chained with a plurality of configurations identical to FIG. 11 to increase the capacity of the system.

Figure 1:
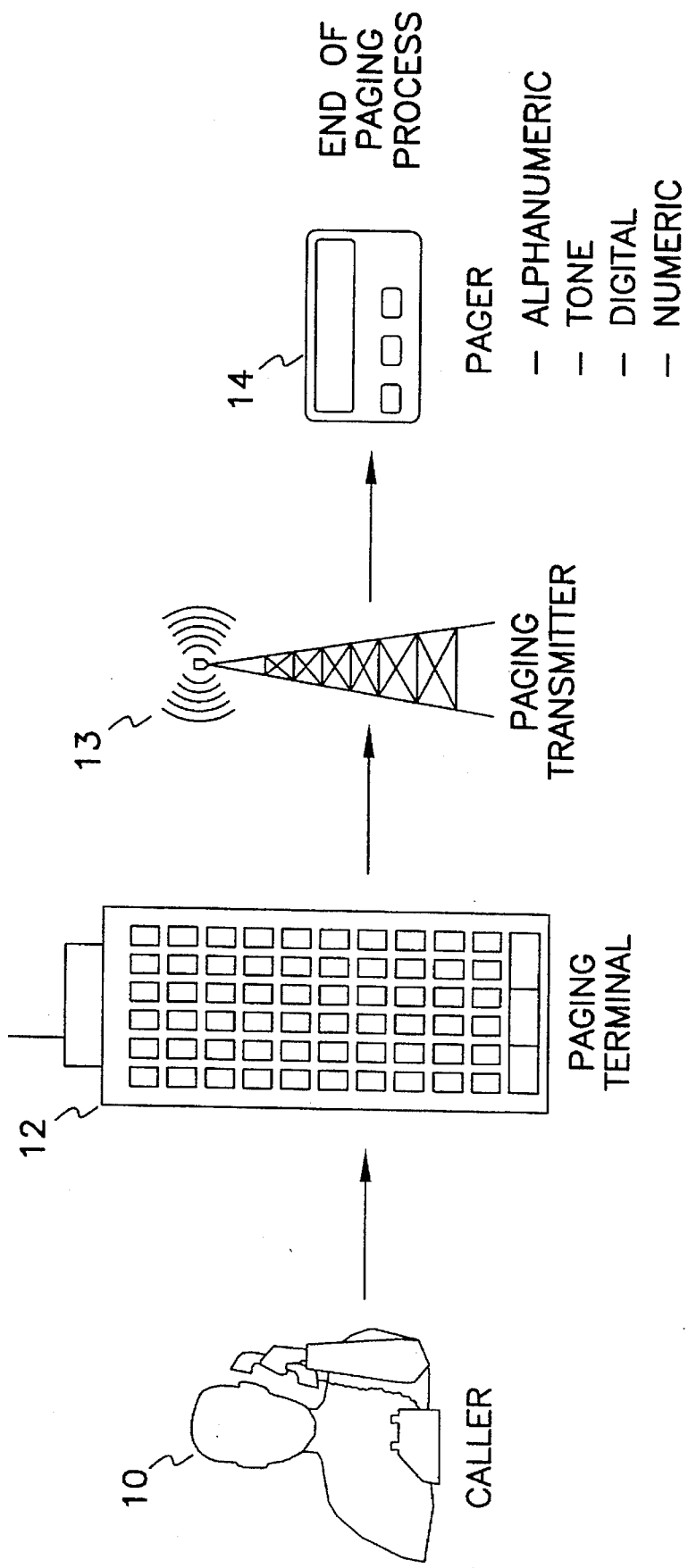
Figure 2:
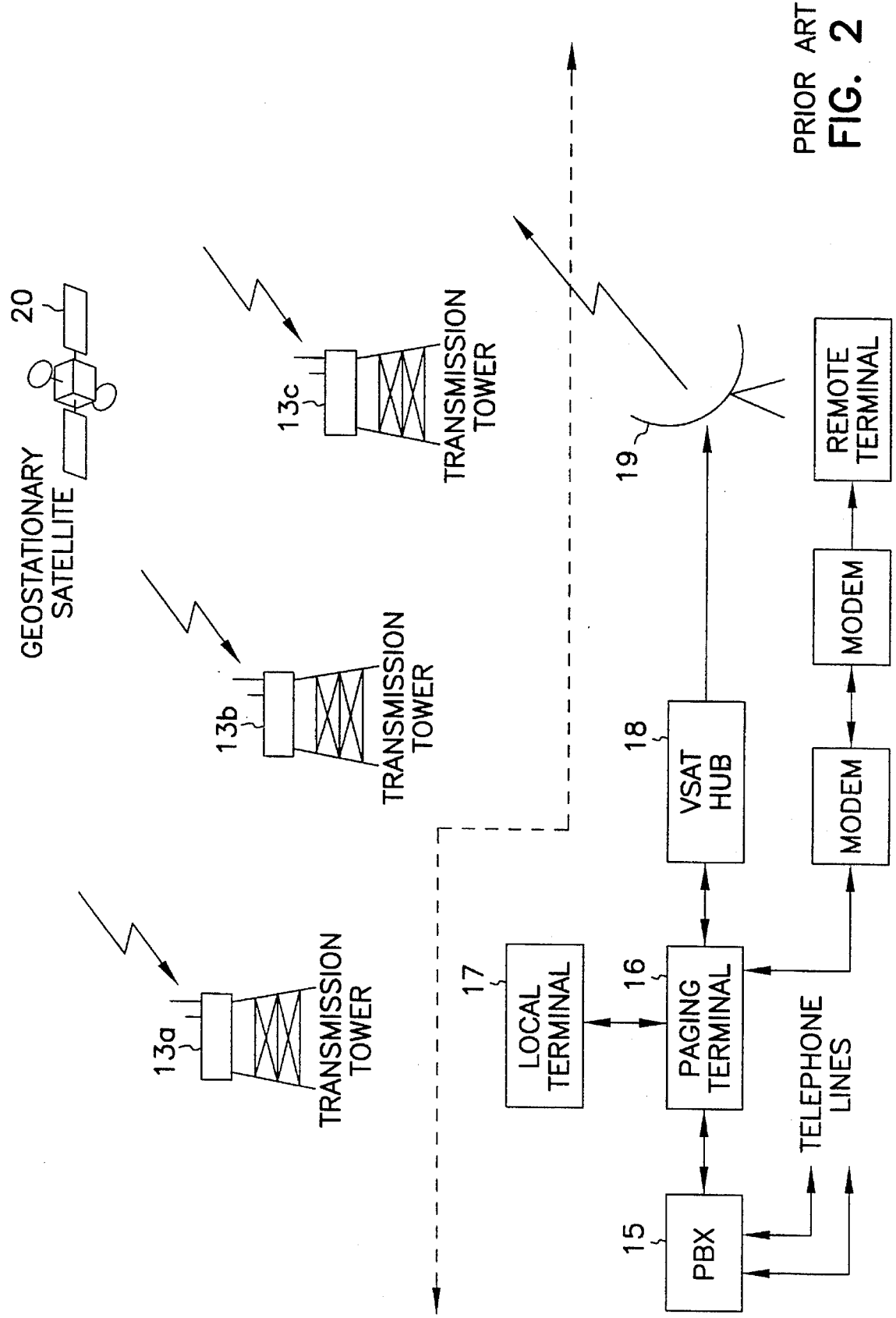
FIG. 2 describes a prior art multiple transmission tower paging system.
Figure 3:
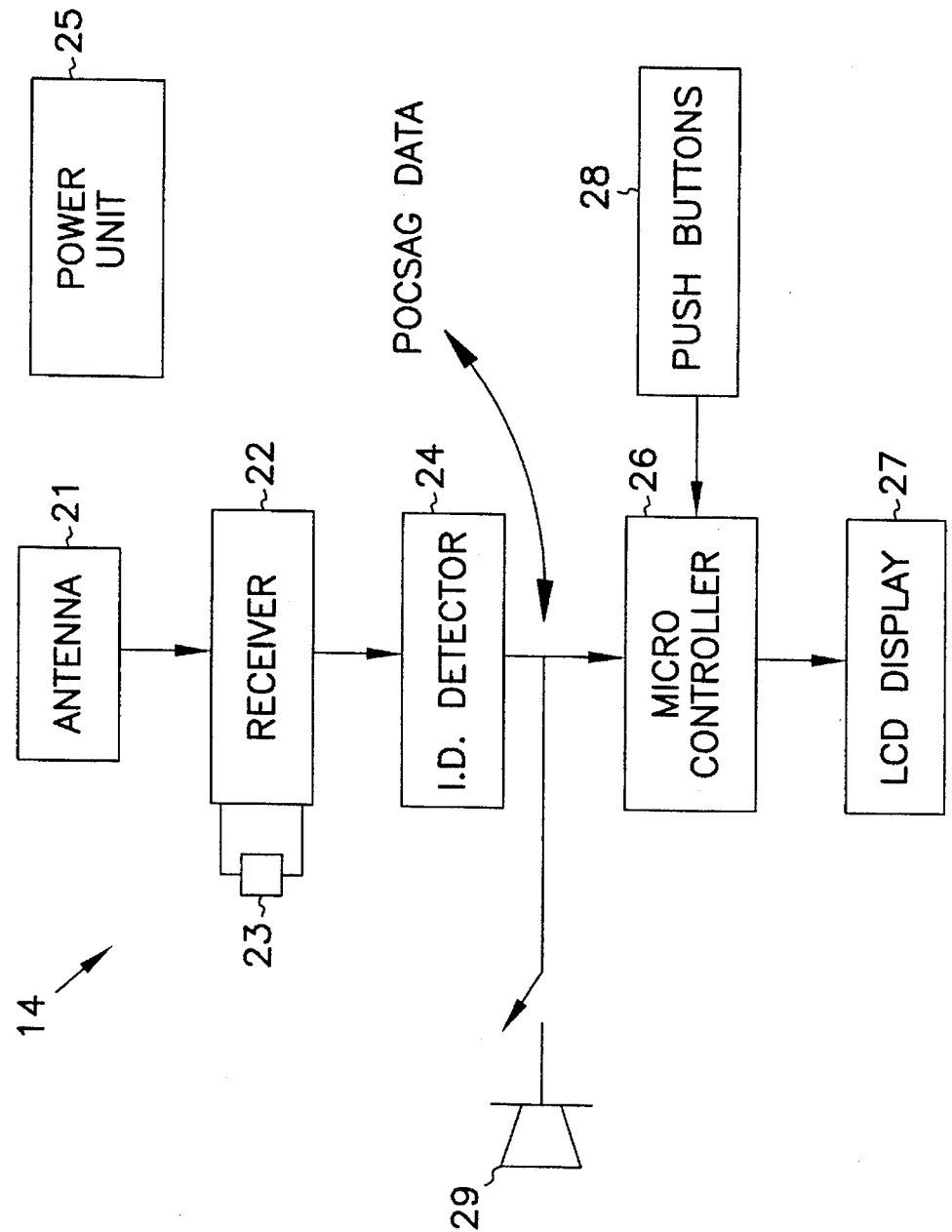
FIG. 3 is a block diagram of a typical prior art one-way remote paging unit.

The individual IF to baseband converters, numbered 1 through 6 (1102a–1102f) shown FIG. 11, operate in parallel but demodulate separate groupings of frequencies. As described above, the reverse pagers are assigned to groups which operate at different frequencies using a different portion of the pseudo-random noise code to perform the hops. In the decoding process shown in FIG. 1, the parallel to IF to baseband converters 1102 numbered 1–6 each operate for a different group of remote pagers and track a different group of frequencies hops. Preferably, the frequency hops are all performed within a limited bandwidth so that the hops all occur within frequencies in the band serviced by a particular converter 1102.

For example, but not by way of limitation, the 70 Mhz IF is carrying a 1.5 Mhz band of individual frequencies. IF to baseband converter number 1 tracks one 36 kHz band of frequency hops within the 1.5 MHz band. All hops by the group of pagers within that band occur within that particular 36 kHz band. Ideally, 40 parallel pipelines of IF to baseband converters 1102 could be operating simultaneously to each service a dedicated 36 kHz band. The actual number of parallel pipelines of IF to baseband converters 1102 required depends on the volume of reverse paging traffic anticipated for a particular market. In the preferred embodiment of the present invention, only six pipelines are described and the frequency hops within each of the 40 groups stay within a 36 kHz band with each pipeline processing an average of six or seven groups. The frequency hops for a particular group may move to a second 36 kHz band according to the synchronization of the hops and the frequencies assigned to the pseudo-random noise code. When this occurs, the parallel pipeline of IF to baseband converter 1102 which is tracking that particular group of pagers will change to a new 36 kHz frequency band or hand off that group to another pipeline. The frequencies assigned to the pseudo-random noise code are preferably selected to be orthogonal sets of frequencies within the 1.5 MHz band which do not overlap for each group of pagers.

Figure 12:
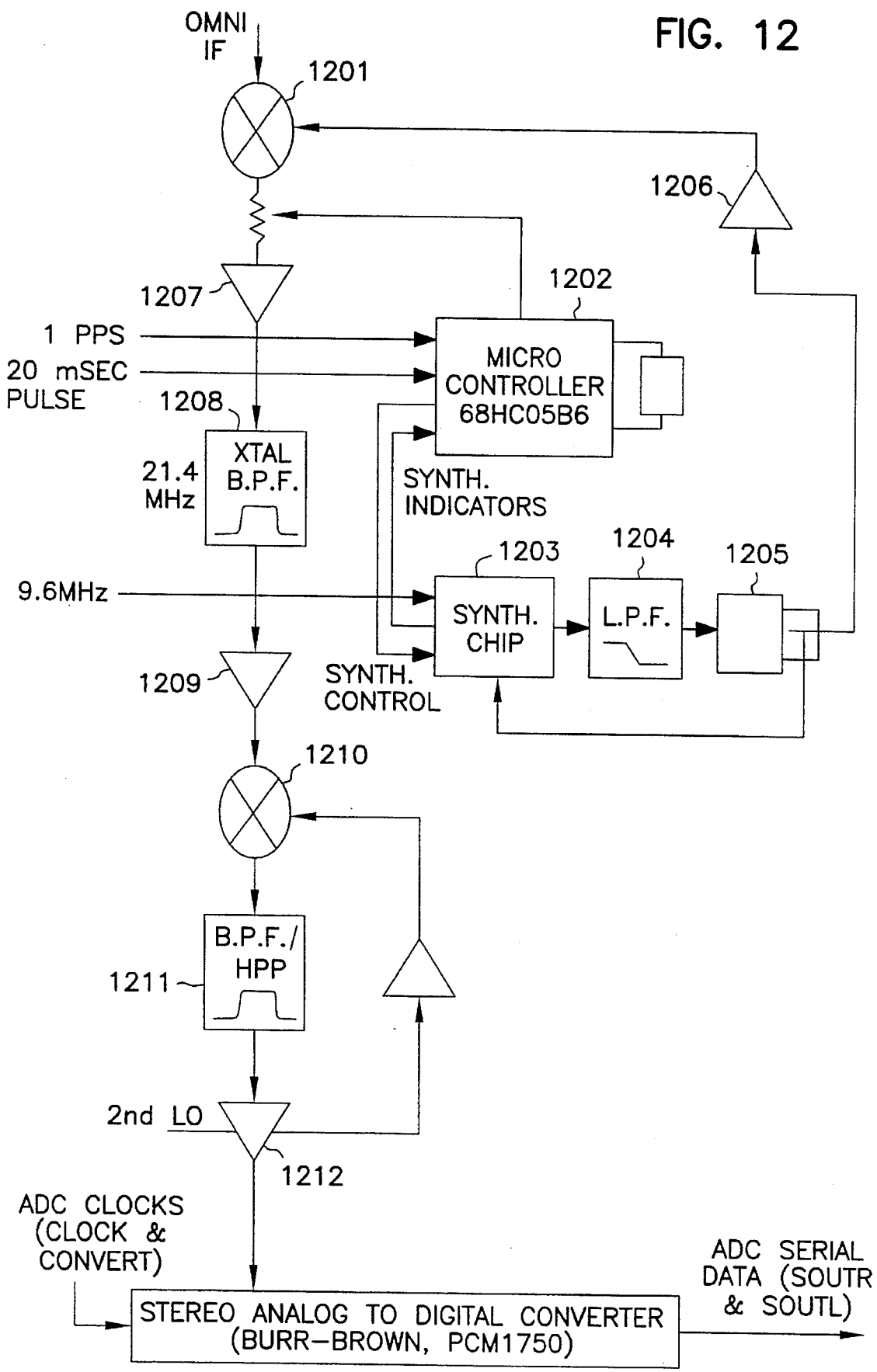
FIG. 12 is a detailed block diagram of the IF to Baseband Convertor of FIG. 11.

FIG. 12 is a block diagram of the IF to baseband convertor 1102 of FIG. 11. As described above, the bandwidth of each channel is 7.5 kHz allowing each pipeline to process four channels. Each IF to baseband converter contains an IF strip which tracks the hopping sequence of the transmission and analyzes four 9 kHz wide sub-bands simultaneously. The 9 kHz bandwidth is selected to provide broad coverage of each 7.5 kHz channel. The IF to baseband convertor of FIG. 12 can track and switch individual 36 kHz wide bands within the 1.5 MHz allocated bandwidth by changing the local oscillator frequency used to downconvert the incoming signal.

As shown in FIG. 11, the IF distribution board 1101 distributes the 70 MHz IF to the plurality of IF to baseband converter pipelines. Also sourced from the IF distribution board 1101 is a 9.6 MHz reference signal in the second local oscillator signal. These oscillators in the IF distribution board 1101 are voltage controlled crystal oscillators (VTCXO). The frequency is locked to a 9.6 MHz reference signal generated by the base system computer 1001 based on an accurate time base from the GPS receiver 1004 of FIG. 10 to avoid time drift. The 9.6 MHz reference frequency is a very narrow bandwidth on the order of 10 hertz in order to preserve the clean phase noise skirt of the VTCXO.

The IF to baseband converter 1002 is shown in detail in FIG. 12. The 70 MHz IF frequency from the omni antenna via the IF distribution board is mixed with a selectable first local oscillator signal by mixer 1201. The frequency of the first local oscillator mixing signal is selected by microcontroller 1202 based upon the 36 kHz band inside the 1.5 MHz band of 70 MHz IF carrier to be selected for decoding by that particular pipeline. Microcontroller 1202 receives its control information as to which segment of the 1.5 MHz band of 70 MHz IF carrier to be down converted from the base system computer 1001. In this fashion, each pipeline is controllable as to which 36 kHz segment it will track to allow it to track frequency hops within a 36 kHz band or long hops between 36 kHz bands. Microcontroller 1202 in the preferred embodiment of the present invention is a Motorola 68HC05B6 microcontroller.

Microcontroller 1202 controls a hopping frequency synthesizer 1203 which generates the local oscillator frequency, for example 91.4 MHz, depending on which 36 kHz slice of 1.5 MHz band of 70 MHz IF carrier signal to be selected for down conversion. The down converter mixing frequency for the first local oscillator 1201 is generated by hopping frequency synthesizer 1202 based upon a controlling hopping clock from microcontroller 1202 and a 9.6 MHz reference signal received from the IF distribution board 1101. This first local oscillator frequency is sent through a low pass filter 1204 and phase locked loop 1205.

The first local oscillator reference frequency is amplified by buffer 1206 for mixing by first local oscillator mixer 1201 with the 70 MHz IF. The first local oscillator 1201 converts the 70 MHz IF to a second IF of 21.4 MHz and is in the preferred embodiment a high dynamic range mixer. The output of first local oscillator mixer 1201 is to produced a second IF frequency to allow the use of an anti-aliasing filter with a steep shape factor. Thus, bandpass filter 1208 receives the second IF from amplifier 1207 to provide filtering using a standard crystal filter.

A second local oscillator 1210 is used to down convert the second IF to a baseband signal and to perform the actual frequency band selection for that particular pipeline. The second local oscillator signal is generated by the IF distribution board 1101. Mixer 1210 receives the 21.4 MHz second IF signal from amplifier 1209 and mixes it with the second local oscillator frequency to produced the actual baseband signal. The second local oscillator converts the second IF to a 75 kHz±18 kHz baseband signal. Another anti-aliasing filter composed of a low-pass filter and high-pass filter in cascade 1211 is provided. A third amplifier 1212 is provided to provide amplification on the order of 40 db.

The baseband selected signal is then sampled by an analog to digital converter using a 100 kilohertz sampling clock. In the preferred embodiment of the present invention a stereo analog digital (A/D) converter, for example Burr-Brown Part No. PCM1750, commonly used in compact disc audio recording technology, is used. This is an 18 bit A/D converter of which only the upper order 16 bits are used.

The digital samples of the signal are then passed for processing to the DSP's, described below. Those skilled in the art will readily recognized that to increase throughput and selectivity of the IF to baseband converter circuit of FIG. 12, parallel subpipelines could be utilized. For example, the 70 MHz IF could be converted into two parallel strips of 25 kilohertz each. Two narrow-band IF's would then be sampled at a 100 kilohertz by each side of the stereo A/D converter.

As shown in FIG. 11, there is a plurality of IF to baseband converter pipelines in the system. In order to provide maximum flexibility, each IF to baseband converter pipeline can be programmed to operate individually because of the distributed control microcontrollers 1202 throughout the pipelines. The digital signal processors also utilize local microcontrollers to load and store the hopping strategy for the individual pipeline. Each IF to baseband converter and associated DSP tracks the hops of a group of remote pagers using the one pulse per second and twenty millisecond pulses for synchronization. The narrow band selection is accomplished by controlling the first local oscillator frequency at 91.4 MHz plus or minus 0.75 MHz providing a resolution of the synthesizer to be approximately 7.5 kilohertz (9.6 MHz divided by 1280). Control of these pipelines is provided from the base system computer 1001 along serial asynchronous control lines.

Digital Signal Processors

The digital signal processors 1103A–1103F of FIG. 11 receive the digitized samples of the particular 75 kHz±18 kHz slice of the 1.5 MHz band and processes these samples to locate the frequency hops and decode the DBPSK data. The main reasons for selecting this bandwidth is to maintain a low cost implementation of each channel by using low-cost off-the-shelf components, to maintain a high dynamic range with an 18-bit A/D convertor (over 75 db strong to weak signal) and to match the processing speed and abilities of currently available off-the-shelf DSP chips.

Figure 13:
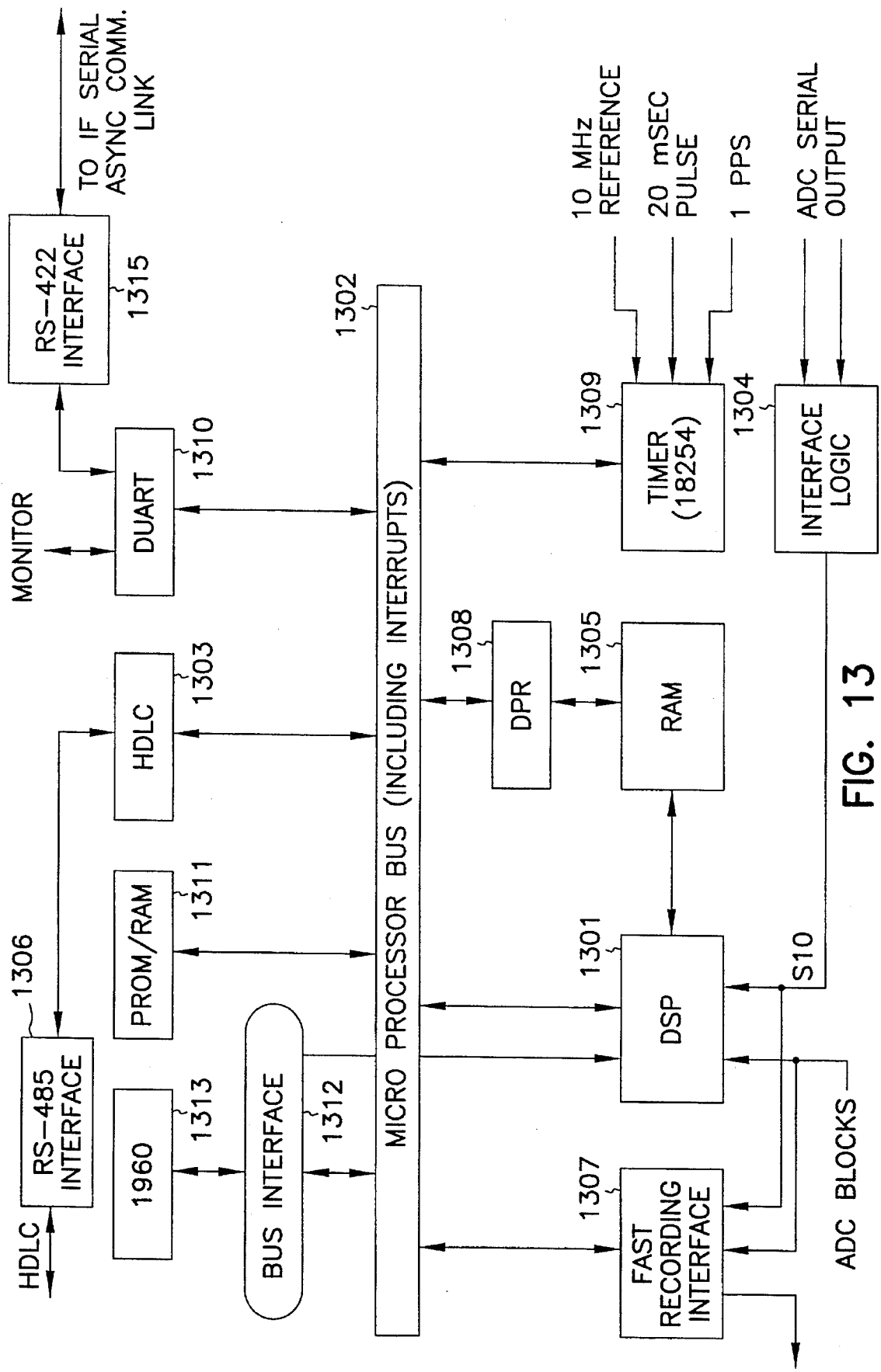
FIG. 13 is a detailed block diagram of the Digital Signal Processor unit of FIG. 11.

The digital signal processors 1103 contain individual DSP chips and microcontrollers as shown in FIG. 13. The DSP circuit of FIG. 13 receives the serial data samples from the A/D converters in the IF to baseband circuit of FIG. 12 via line ADC SERIAL OUTPUT. The serial data is fed to DSP chip 1301 which is connected and controlled through a microprocessor bus 1302 for control by local controller 1303. The A/D serial data is also fed through a fast recording interface 1307 for storage in local memory 1305. The serial data arrives by serial lines through interface 1304. It is multiplexed by interface logic circuit 1304 and stored in RAM 1305 in batches of 5 milliseconds of samples synchronized to the 5 millisecond clock.

The 5 millisecond batches correspond to 1 bit of a single frequency hop. Each batch of data is Fourier transformed using a Fast Fourier Transform (FFT) algorithm and stored for analysis of the complete hop. In order to perform RADIX-2 FFT, the sampling length must be 512 samples such that there is an overlap of 12 samples between two consecutive FFT's. The timing of the sampling however does not equate to 512 samples since sampling a 5 ms frequency bit at a 100 kilohertz only provides 500 samples. The additional twelve samples are stuffed zeroes. In general, synchronization on a hop begins with the preamble. The DSP will load and store the complete hop and will then try to identify the peaks in the frequency domain. After identifying the peaks, the processor will look for the appropriate pattern of the preamble for that hop. Once the preamble is detected, the DSP 1301 will extract the data.

Bit extraction is done only in the neighborhood of the frequencies in which the activity was detected. The processor identifies the phase changes between bits and reports the results to controller 1303 via bus 1302. The preferred embodiment of the present invention, local controller 1303 is a twenty-four bit processor Part No. 56002. The RAM 1303 must have a minimum depth of 32k.

The software for controlling the processing shown in FIG. 13 is downloaded from the system controller using an internal boot program well known to those skilled in the art. The DSP algorithms are described below in conjunction with FIGS. 17 and 18. The board controller is a i960 which is supported by a DUSART, USRT memory and glue logic. Once DSP has decoded the bits of each hop, the controller 1303 will decode the message apply the error correction schemes and present the decoded data via RS-485 interface to the base system computer 1001.

The message decoding involves a soft decision algorithm for error correction and detection and deinterleaving of the messaging, described more fully below.

DSP Algorithms

Figure 17:
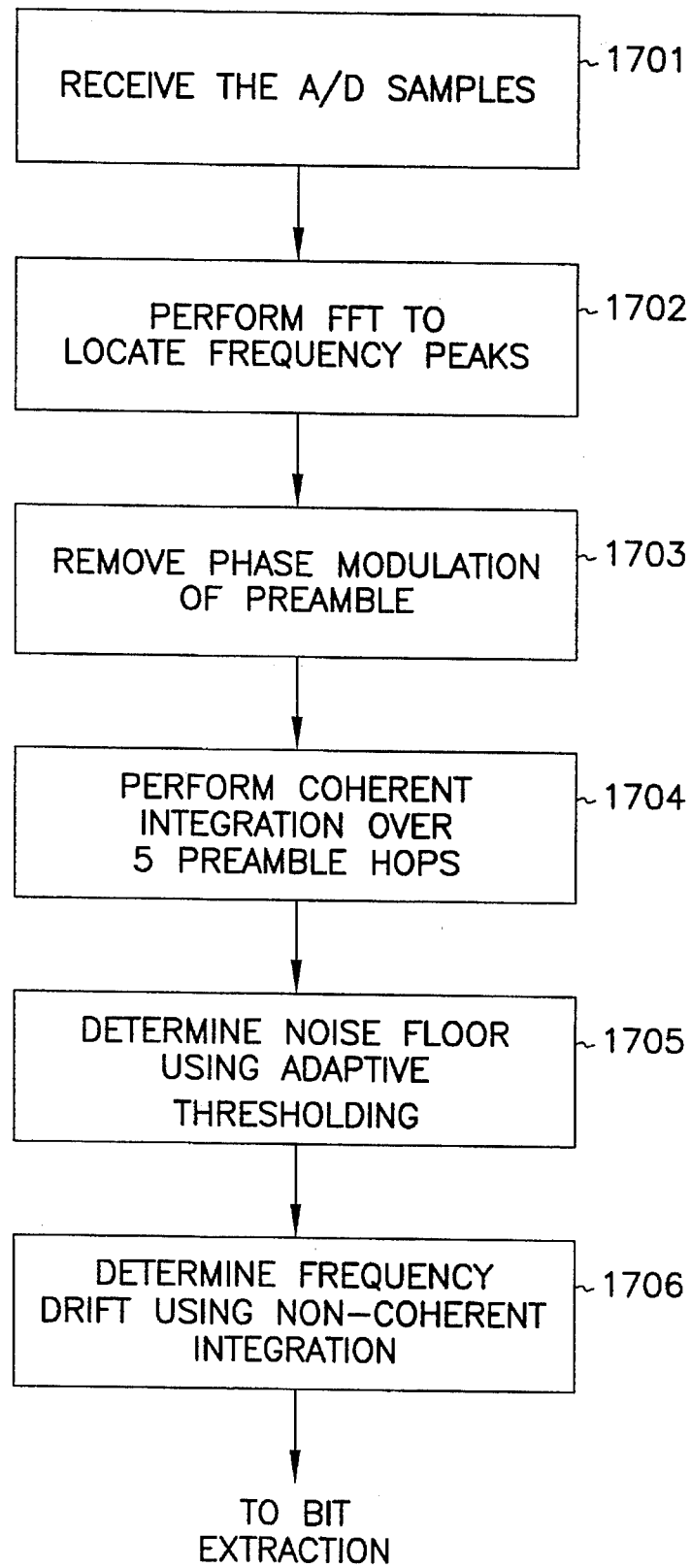
FIG. 17 is a high level flow chart of the preamble detection algorithm implemented in the DSP unit of FIG. 13.

Referring to both FIG. 13 and FIG. 17, the digital samples of each five millisecond bit of the frequency hop is digitized and passed from the A/D converter to the DSP at 1701. The 500 16-bit samples, with twelve zero-stuffed samples, represent a single bit of the biphase encoded PSK which will represent a single phase of the same frequency of the entire hop. The next set of samples may be another phase, but of the same frequency. If a 10 kilohertz frequency is sampled, for example, there will be fifty cycles of frequency within the 5 milliseconds.

The samples may or may not contain any frequency of interest, however, they will contain additional noise and some interference. The viewing of these samples is accomplished in the frequency domain to locate peaks indicating received frequencies at 1702. This initial look at the samples is performed with a fast Fourier transform which is well known to those skilled in the art. This FFT algorithm operates at a 30 khz bandwidth and the 10 khz signal, used as an example here, will lie somewhere in that band.

The FFT is done using 512 cells spanning from zero to 100 khz. Each frequency cell has a bandwidth of approximately 200 hertz in the frequency domain. Each 200 hertz cell will contain some energy from the spectrum. Of the 100 khz bandwidth processed by the FFT in DSP 1301, only approximately 75 kHz±18 kHz will be of interest. The first event in the process of decoding the message is to perform adaptive thresholding through a series of steps at 1703 through 1705 to determine the noise floor. This is accomplished by integrating the signals over a large period of time. By performing adaptive thresholding, the noise threshold averaged over a large period of time may be determined. The spectrum of interest lies within a 75 kHz±18 kHz band such that when the average noise of the spectrum is determined, it can be evaluated whether the signal is larger than the noise to locate the frequency peaks in the frequency domain.

In order to determine the noise threshold, integration must be performed over more than one bit. Since the noise across a large period of time, that is across a number of 5 millisecond bits, is statistical, it will integrate only as the square root of the number of times of the number of bits that are integrated. The signals within that area are coherent so they will integrate to the power of N, where N equals the number of bits. Thus, if integrating over 10 bits, the power of the frequency of interest will be multiplied by the power of 10, divided by the square root of 10, to get an integration factor of 3.1.

The problem with integrating over a number of bits is that some of the bits will be in phase of the frequency of interest and some will be out of phase. Thus, some of the frequencies are in phase and some are inverted phase, which, if not corrected, will reduce the power of the signal over the integration period. Thus, to know whether the bits are in phase or out of phase, the noise sampling will take place during the preamble at 1703 where it is known whether the bits are in phase or out of phase based on a known preamble sequence. Thus, of a 53-hop message, the first five hops are preambles with known information, that is, it is known a priori whether the bit will be in phase or out of phase.

Referring to Table 1, the preamble is 165 bits spread over five hops such that 33 bits per hop. A single hop is shown in Table 3 where a single hop is comprised of 33 5 millisecond frequency transmissions. Each 5 millisecond frequency within the preamble is an alternating 1 0 1 0 1 0 pattern which is known to the receiving system. Since it is known a priori what the bits will be during the preamble, bit inversion, or phase inversion, can be performed at 1703 according to the alternating one-zero pattern to aid in determining the noise threshold.

Coherent integration at 1704 is performed at 1704 over the period of five hops of preamble after correction of the phase of each bit. In this fashion, the frequency of the preambles will stand out within the frequency spectrum and a noise floor or noise threshold can be calculated.

The FFT provides as a output the phase and quadrature values in a complex value defining a vector and phase on a phase plot. The complex value, known to those skilled in the art as the I and Q values, make up this complex number. The absolute value or the square of the I plus the square of the Q provides the total energy of the signal at each phase. At this stage in processing, the phase information is lost since the DSP is only calculating the total energy within each 200 hertz cell of the FFT.

After the noise thresholding, coherent integration is performed at 1706 after it is determined what the power of the spectrum is in each 200 hertz cell. Coherent integration is performed over a period of 40 milliseconds which comprises eight bits. The coherent integration takes 40 millisecond slices of each hop in series to perform four slices of 40 milliseconds each for each hop. The additional five milliseconds is thrown out and the coherent integration continues over the five hops of the preamble. After taking four 40 millisecond slices of each hop over five hops, the total integration period is over twenty intervals of 40 milliseconds each. In this fashion, a very clear signal-to-noise ratio is known.

Those skilled in the art will readily recognize that incoherent integration can be used rather than coherent integration at this point is to track the frequency deviation due to drift occurring in the transmitter during a large interval. Although coherent integration provides a better signal-to-noise ratio (on the order of the square root of N) incoherent integration can be used with a less desirable signal-to-noise ratio (on the order of the square root of N) since the frequency is not stable. During a frequency drift during the integration time, incoherent integration will lose some of the integration power during a long interval. By doing incoherent integration over relatively short intervals of approximately 40 milliseconds each, the problem of drifting of the frequency of the signals over a large interval can be overcome since incoherent integration is not as sensitive to the drift in phase.

At this step in the processing, the DSP has viewed a large spectrum that has noise that averages out after five hops and a signal that is averaged over five hops. By doing coherent integration, the algorithm uses a moving average during the whole detection process.

To locate the energy of interest within the 200 hertz cells of the FFT, a moving window is used over the interval to find the cells which have frequency energy in them. In the moving window process, the left cell, the right cell, and the center cell have a 3-cell segment which is viewed. The moving window is then moved up the frequency spectrum comparing each center cell with its neighbors. If the center energy is more than the average energy of the neighbors, that will mean that a frequency of some interest will be in the middle cell. If noise is found in the three cells, there is no signal in the middle cell. This is termed a moving average window plus slot, since the slot is the center cell of interest. Once the spectral energy is found in the cell, that cell is tagged as potentially having a frequency of interest. The cells that are tagged as a result of the moving window plus slot indicate a located frequency.

In some situations, two adjacent cells will pass the threshold. This is because the frequency of interest did not lie within the center of a 200 hertz cell. When this happens, part of the energy will appear in one cell toward the wall of the cell or the side of the cell and the remaining energy will appear next to the adjacent wall of the neighboring cell. To determine if a frequency is of interest when split between two cells, an additional process of interpolation must be performed.

Figure 14:
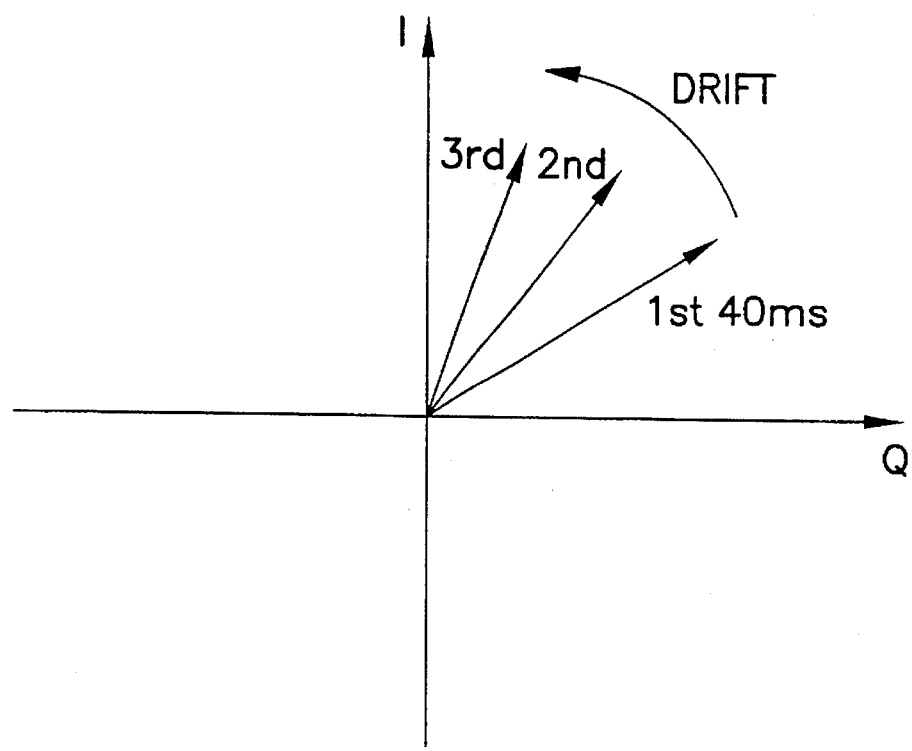
FIG. 14 is a phaser diagram depicting phase drift across one frequency hop.

Interpolation is an approximate method to find where the frequency lies between the two adjacent cells. The signals once again are taken over an integration period of 40 milliseconds to determine what the frequency drift or phase drift of the frequency of interest is from center to center. It is likely that the frequency of interest which is split between two cells is the result of a drifting transmit frequency during one hop. By comparing the sequential 40 millisecond integration results, the change in the frequency phaser, that is graphed as an I-Q value on a frequency phaser plot, can be viewed by comparing the sequential 40 millisecond deviations to note the drift over time such as that shown in FIG. 14. Thus, some information will be obtained as to the frequency within each hop and how that frequency is drifting between the 40 millisecond non-coherent integration intervals. So within each of the 40 millisecond integration periods, some of the frequencies will appear in the center of the 200 hertz bins and some will appear split between adjacent bins. By viewing the 40 millisecond integration periods in which the frequencies appear in the center of the bin, the frequency can be determined for the other 40 millisecond integration periods in which the energy should appear between bins based on the known phase drift of the signal. Thus, by knowing the approximate frequency of interest, and having the known drift of that frequency, the drift rate of this frequency is known. The drift rate then is a frequency offset from the center of the 200 hertz bins. The phase drift and the frequencies of interest are saved in memory as the result of this process.

Figure 15:
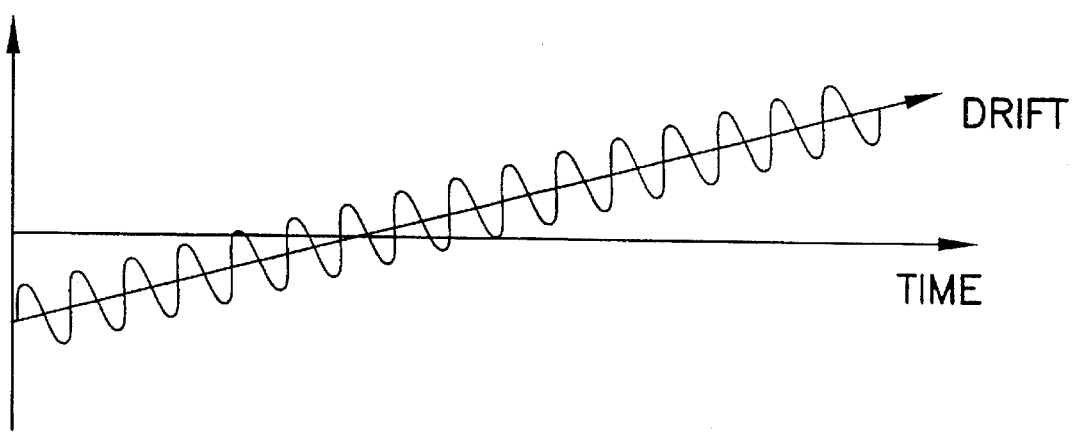
FIG. 15 is a phase versus time plot of phase drift across one frequency hop.

The actual phase drift of a transmitted frequency can be quite severe over the course of a 10-second transmit interval of an acknowledgment from the remote pager, as illustrated in FIG. 15. By knowing the phase drift however, the phase of the signal can be determined and tracked throughout the entire acknowledgment message. Therefore, correction can be made and accurate phase information can be extracted from the individual bits even in the presence of phase drift of the frequency. With this known phase drift information, the phase drift of future received frequencies of unknown bits containing actual information, not preamble, can be predicted. The phase drift is typically linear, so predicted phase drift will be known.

Bit Extraction

Figure 18:
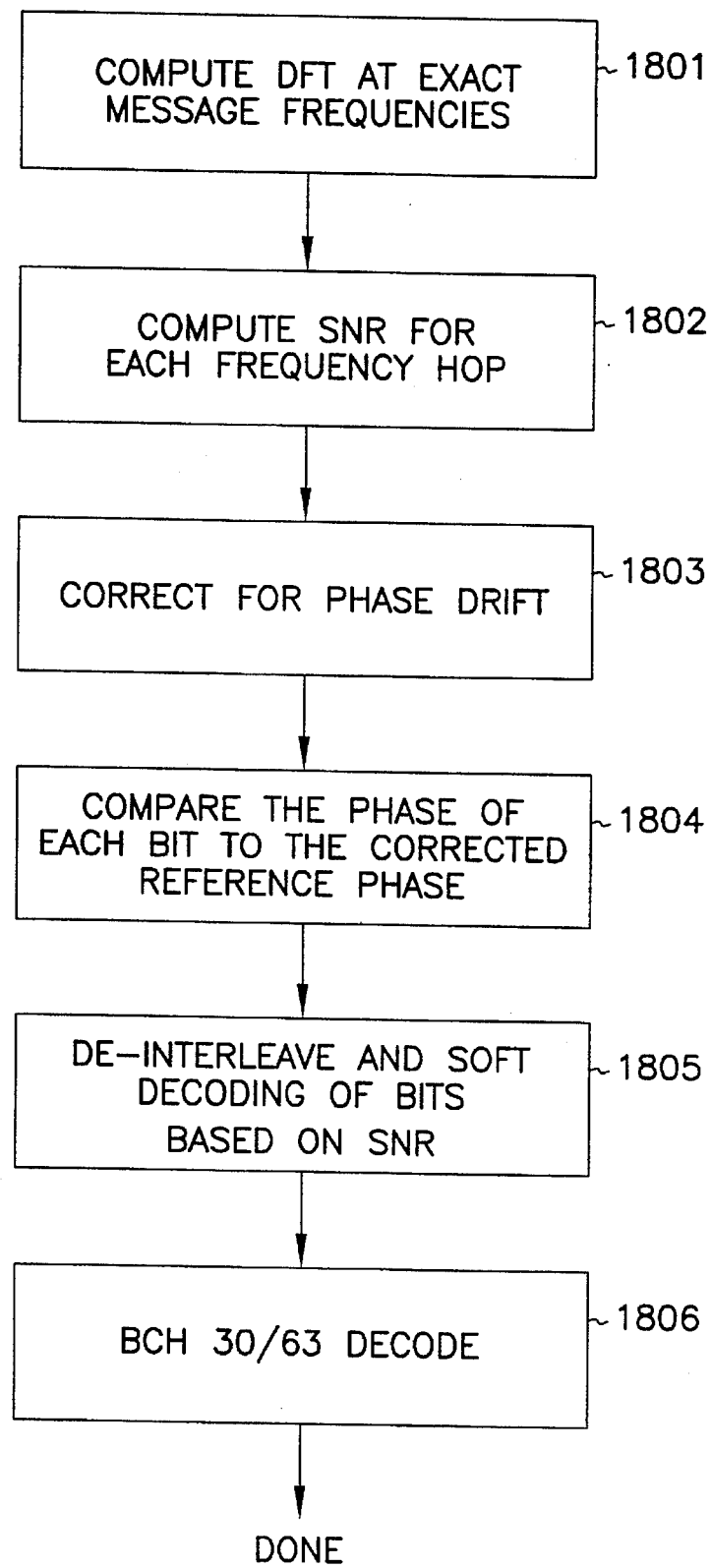
FIG. 18 is a high level flow chart of the message decoding algorithm implemented in the DSP unit of FIG. 13.

Now that the phase drift is known, and the frequencies of interest are located using fast Fourier transform, the actual phase information of individual bits of interest are extracted, as described in FIG. 18. This is done using Discrete Fourier Transform (DFT) at 1801. Since the frequencies of interest have already been located using the Fast Fourier Transform across a broad spectrum, the Discrete Fourier Transform, which typically requires much more processing power than an FFT, is used on a narrow bandwidth. The DFT analyzes the frequencies only on the frequencies located using the FFT where the frequencies lie within a 75 kHz±18 kHz band. The DFT is actually performed using only four single cells or bins in a 75 kHz±18 kHz band.

As described above, the drift in frequency of the current hop must be known to accurately decode the phase of the bit of information within that hop according to the differential BPSK encoding. As shown in Table 3, the first bit of a single hop is the reference bit which follows the 15 millisecond guard time of an individual hop. After the preamble detection, the actual information of the message must be decoded by comparing the phase of the frequencies of the bits of each hop to the reference bit. Thus, it is of paramount importance that the accurate phase of the reference bit be determined. To insure that the accurate phase of the reference bit has been determined, the phase drift of the signal must be known and a predictor must also be used to predict the shifting of the phase for each subsequent bit after the reference bit to insure an accurate comparison of the reference bit, i.e., bit one of one hop, to the 32nd bit of that hop. Phase drift could be occurring during a single hop such that the phase of the 32nd bit of that hop may have altered to the point of giving inaccurate comparison to the reference bit. Thus the phase predictor is used to compensate for the phase drift and insure accurate decoding of the DPBSK.

Drift Prediction

The prediction of the drift of the frequency transmitted by the reverse pager is based on the history of the preamble and the history of the current and previous hops being decoded by the DFT. The drift in frequency is approximated by the following formula:

$$\Delta\psi = 2\pi \Delta F \times T$$

where $\Delta\psi$ is the phase drift and $\Delta F$ is the change in frequency over time. So, over a 5 millisecond interval, where T=5 ms, if there is a change in frequency $\Delta F$, which is different from zero, there is a $\Delta\psi$ phase change.

Figure 16:
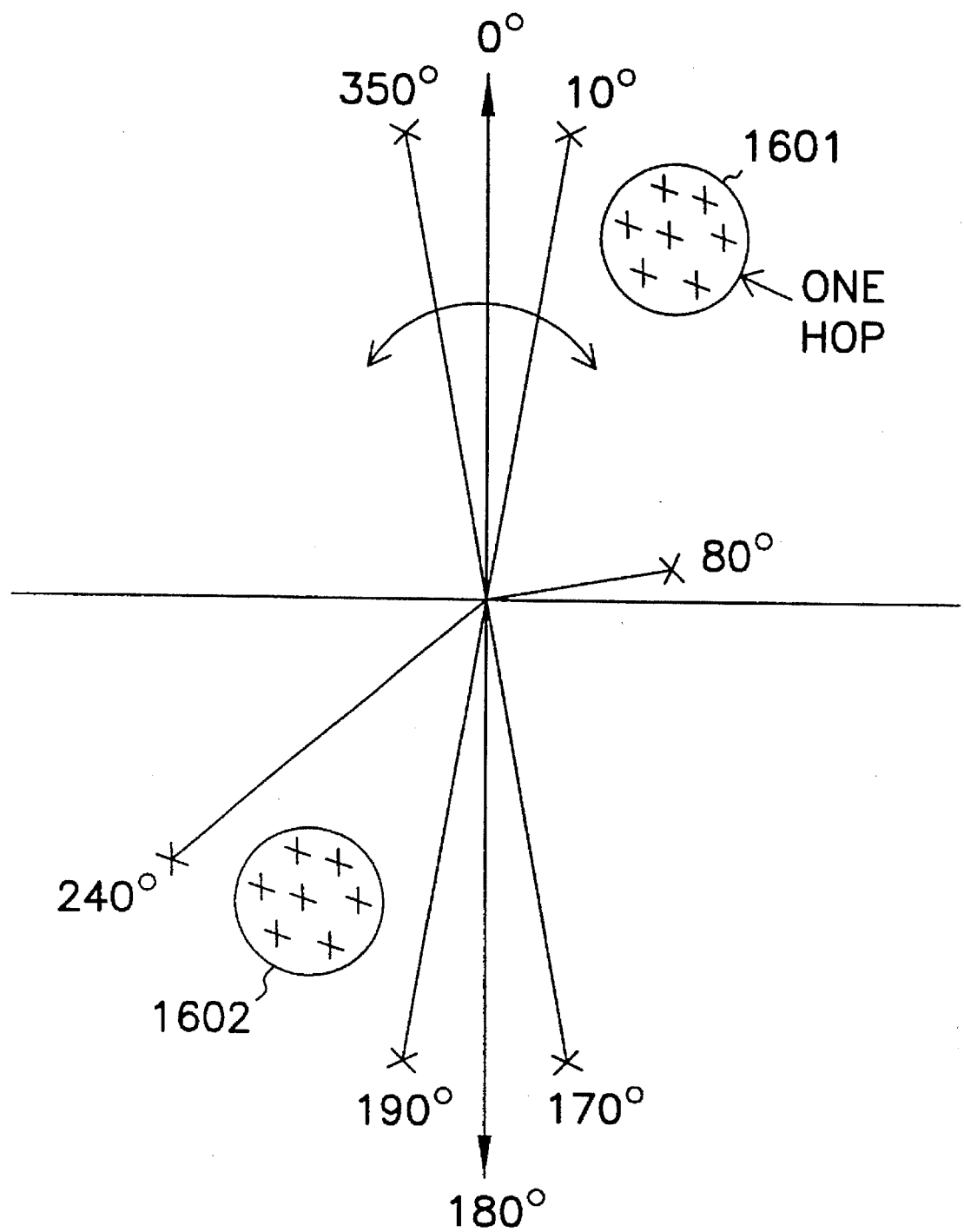
FIG. 16 is a phaser diagram depicting phase jitter and phase noise across one frequency hop.

FIG. 16 shows the phasers indicating accurately decoded frequencies during the bit times of a hop. The shift in frequency is shown by a drift between the decoded phasers of FIG. 16. For example, a 10 degree phase off the predicted zero degree norm can accurately be decoded as a zero bit. Over the course of the message, the zero bit may drift through zero degrees to appear as a 350 degree phaser. In a similar fashion, during one bit of a hop, 170 degree phaser may be decoded while in a subsequent hop a 190 degree phase may be decoded as compared to the reference phase of the reference bit of that hop. By evaluating the differential phase referenced to zero and 180 degrees, the phase drift is evaluated during the period of one hop. If it is known that the average drift over one hop is 10 degrees then $\Delta\psi$ can be predicted for each individual 5 millisecond bit of the hop. This provides a correction for each bit based on a prediction of the phase shift and accurate decoding of the bits during the transmission as shown at 1803 in FIG. 18.

If, for example, a 240 degree phase shift is decoded for a particular bit, it may be difficult to determine if that decoded phase is representative of a bit zero (zero degrees) or a bit one (180 degrees). The error is not the difference between 240 degrees and 180 degrees, but the error is the difference between 240 degrees and the predicted phase based on the drift off 180 degrees. In this fashion, more accurate prediction of phase and minimization of error of decoding of bits is accomplished.

The drift over a period of ten seconds, the nominal time of a single transmission of a reverse pager, is at the most on the order of 15 hertz. In a 200 hertz cell from the FFT, this translates to an error of at the most, 90 degrees over the entire interval of the transmission. If, however, the DSP is integrating between hops, a much greater drift may occur from hop to hop. With the prediction and correction to the prediction on the DFT, this prediction of frequency drift is applicable between hops since the same oscillator suffering the same drift is used for the different frequencies of the different hops. Thus the prediction can be carried between hops and used fairly accurately to decode the bits as shown at 1804 in FIG. 18.

Confidence Factor

After the bits have been decoded according to the known phase drift, the confidence that the bit is a zero or one is next determined. As described above, inner- and outer-coding of the message is performed to minimize the bit error rate. Interleaving is also accomplished to minimize the complete loss of information due to a noise burst. Thus, de-interleaving is accomplished to determine the correct bit values in the presence of noise as shown at 1805 in FIG. 18.

Actual bit decisions are performed using a soft-decision algorithm as shown at 1805 of FIG. 18. The innercoding and inter-leaving scheme places a copy of each bit in eight different hops, thus providing frequency diversity. The method to do a soft decision is to base each bit decision, that is a decision as to whether the bit is a one or zero, based on a weighted average over the eight copies of each bit. The coefficient weighting a specific copy is a reciprocal of the signal-to-noise ratio in the relevant hop.

The interleaving format shown in Table 2 allows for the duplication of the 33 bits of each hop. As shown in Table 2, a 64-bit data-word is divided into 32-bit data parcels and a reference bit is added to make up a 33-bit hop. Each of the 32-bit data parcels is then interleaved in an A B A B format as shown in Table 2. Thus, each data bit within each parcel is duplicated eight times.

The signal-to-noise ratio is known for each hop as described above. In addition, there is recorded a phase predictor for each hop which indicates the phase drift across a single hop for a single frequency. However, due to noise in the signal, it is often the case that there is a plurality of non-linear values for the phase of the individual bits in one hop instead of a constant phase drift. The plurality of individual values is indicated by a plurality of "x's" at 1601 and 1602 in FIG. 16. If a single value for the phase is decoded for a single hop, there is very little noise. However, if there are a plurality of values such as that shown in FIG. 16, there is some noise obscuring the received signal. By determining the standard deviation of the differential hop phases 1601 and 1602 there is a good evaluation as to what the signal-to-interference ratio is. Interference does not mix very well with the signal and will cause a large number of decoded phase values for a single hop. Thus, the standard deviation of the value of the phase around zero and around 180 degrees gives an evaluation for the signal-to-interference ratio of a single hop. The standard deviation of the values received for a single hop is the weighting factor used to determine the validity of all of the bits received during a single hop.

TABLE 4

Soft Inner Decoding

= One Frequency Hop

| A | B | A | B | A | B | A | B | A | B | A | B | A | B | A | B |

| Hop | Decoded Bit | S/N Weight | Result |
|---|---|---|---|
| 1 | 1 | 10 | +10 |
| 2 | 1 | 8 | +8 |
| 3 | 1 | 3 | +3 |
| 4 | 0 | 1 | −1 |
| 5 | 1 | 9 | +9 |
| 6 | 1 | 2 | +2 |
| 7 | 1 | 10 | +10 |
| 8 | 0 | 2 | −2 |
|   |   |   | +39 |

Confidence: 39/80 that a ONE was decoded.

Table 4 shows the weighting of the eight interleaved bits representing a single bit across a plurality of hops. The values for the bits are summed based on a weighting determined from the standard deviation of the individual hops. Thus, if the standard deviation for an individual hop is very low, the confidence that the bits have been accurately decoded for that hop may be ten on a scale of one to ten where 10 has the highest confidence of correct decoding. If, however, the standard deviation is quite large for the received decoded phases for that individual hop, the weighting factor may be one. To increase the confidence of the received message, the weighting is used to remove decoded bit values that are too low in value and quite possibly decoded in error. In this fashion, only the high-confidence bits are used to determine the accurate decoding of an individual bit.

Finally, the soft decoded bits are inner-decoded using the reverse BCH ³⁰⁄₆₃ algorithm to extract the actual data bits as shown at 1806 of FIG. 18.

Remote Reverse Pager

Figure 19:
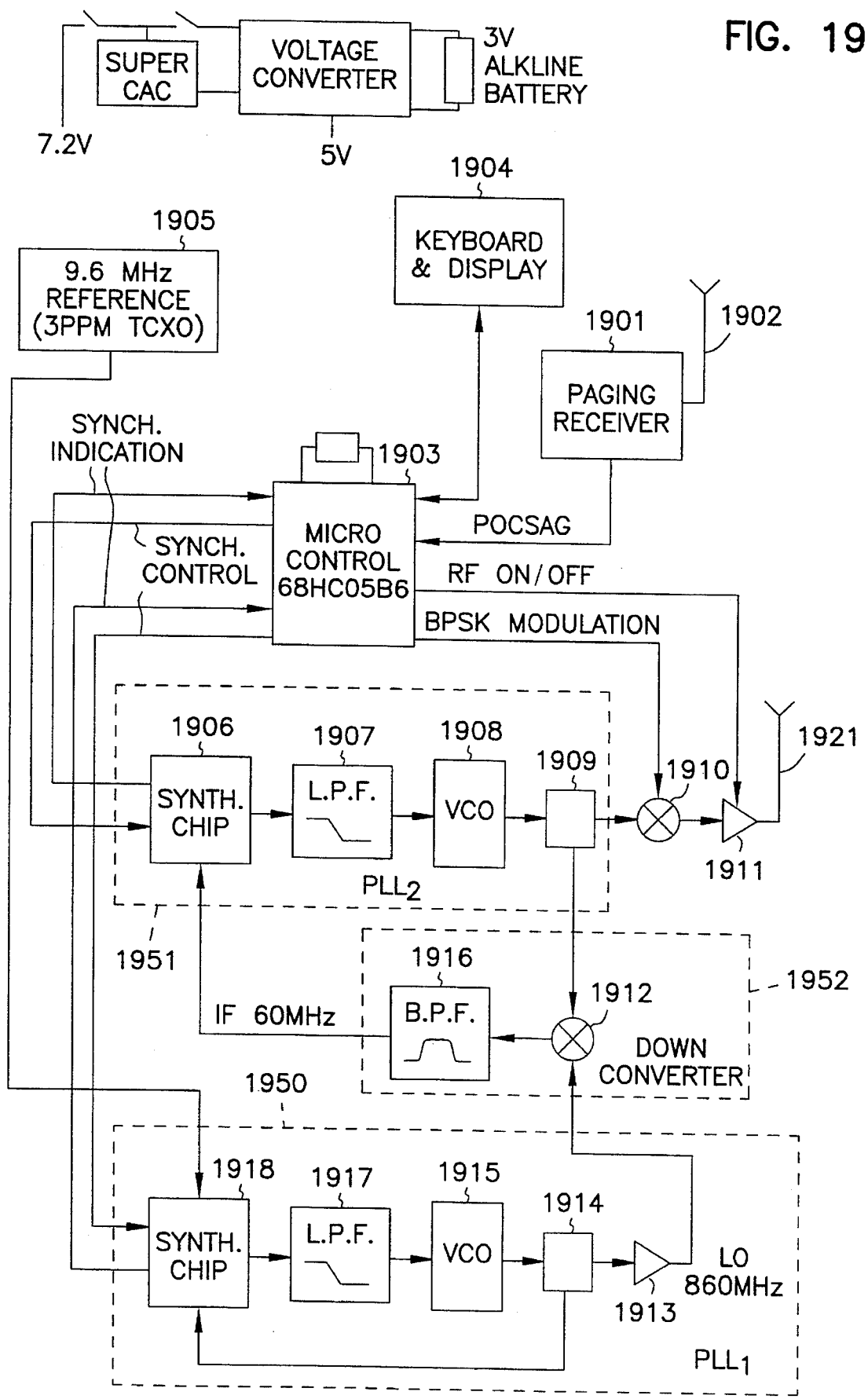
FIG. 19 is a detailed block diagram of a reverse pager.

FIG. 19 is a block diagram of the remote reverse pager used in the preferred embodiment of the present invention. The paging receiver 1901 is of a standard design well known to those skilled in the industry. The paging receiver receives digital paging information either in the POCSAG format, ERIES format, FLEX format or other industry standard formats. The paging receiver down converts the paging signal from antenna 1902 and provides the POCSAG data to the microcontroller 1903. Microcontroller 1903 controls the entire remote pager shown in FIG. 19 and is in the preferred embodiment Motorola Part No. 68HC05B6. Attached to microcontroller 1903 is a keyboard and display 1904 for displaying messages, menu options for acknowledgement, status and the like and a keyboard or keypad or a limited number of keys for entering information and acknowledgement decisions.

Essential to the proper operation of the reverse paging system is the ability of the individual reverse pagers to produce extremely narrow frequencies within a limited accuracy of the needed frequency to transmit the acknowledgement signals using DBPSK to the paging terminal 16. As described above, each frequency hop is allocated 7.5 kilohertz channel bandwidth within the frequency list. The actual frequency transmitted by the remote reverse pager FIG. 19 must lie within that band to be properly decoded, however, in order to allow for collision avoidance between multiply transmitting pagers of the same group, the location of the narrow band frequency within the 7.5 kilohertz channel does not have to lie at the dead center. In fact, the inaccuracy of the location of the exact frequency within the 7.5 kilohertz channel transmitted by the reverse remote pager FIG. 19 is encouraged to be off center so that multiple-transmitting pagers within the same group can be distinguished. For example, statistical distribution of multiply transmitting reverse remote pagers from the same group would allow proper decoding of simultaneous messages as long as the narrow band frequencies are limited to approximately 100 hertz skirt at the transmitting frequency. Since the resolution of the FFT and DFT algorithms used in the paging terminal is on the order of 200 hertz, most collisions of simultaneously transmitting pagers within a single group can be avoided.

A key to ensuring that the transmitted frequency is extremely narrow and lies within the selected 7.5 kilohertz channel frequency of the selected hop, a special double loop phase lock loop digital synthesizer is shown in FIG. 19. Because differential bi-phase shift keying is required for transmission, phase noise of the generated frequency must be kept to a minimum. In addition, the lock time of the PLL must be fast to allow rapid hopping between frequencies. The new hop frequency selected by the double loop PLL must settle and generate a clean, narrow skirt frequency within the 15 millisecond guard band shown in Table 3 for a single frequency hop. The phase noise of the frequency transmitted across a single hop for the 32 bits plus reference bit must be kept at a minimum to ensure proper decoding of the 180° phase shift between bits indicating digital zero and one.

To ensure proper lock and stabilization of the hop frequency, the double loop PLL must lock in less than 5 milliseconds. To meet these requirements, the double loop PLL shown in FIG. 19 is specially designed to hop and lock a 900 megahertz carrier within a narrow frequency range. Tests have shown that the phase noise requirement of −80 dbc/hertz at 1 kilohertz from carrier or −90 dbc/hertz at 5 kilohertz from carrier producing a narrow band frequency which is less than 200 hertz wide. The double PLL loop design shown in FIG. 19 adds 23 db to the phase noise, which is acceptable.

Figure 20:
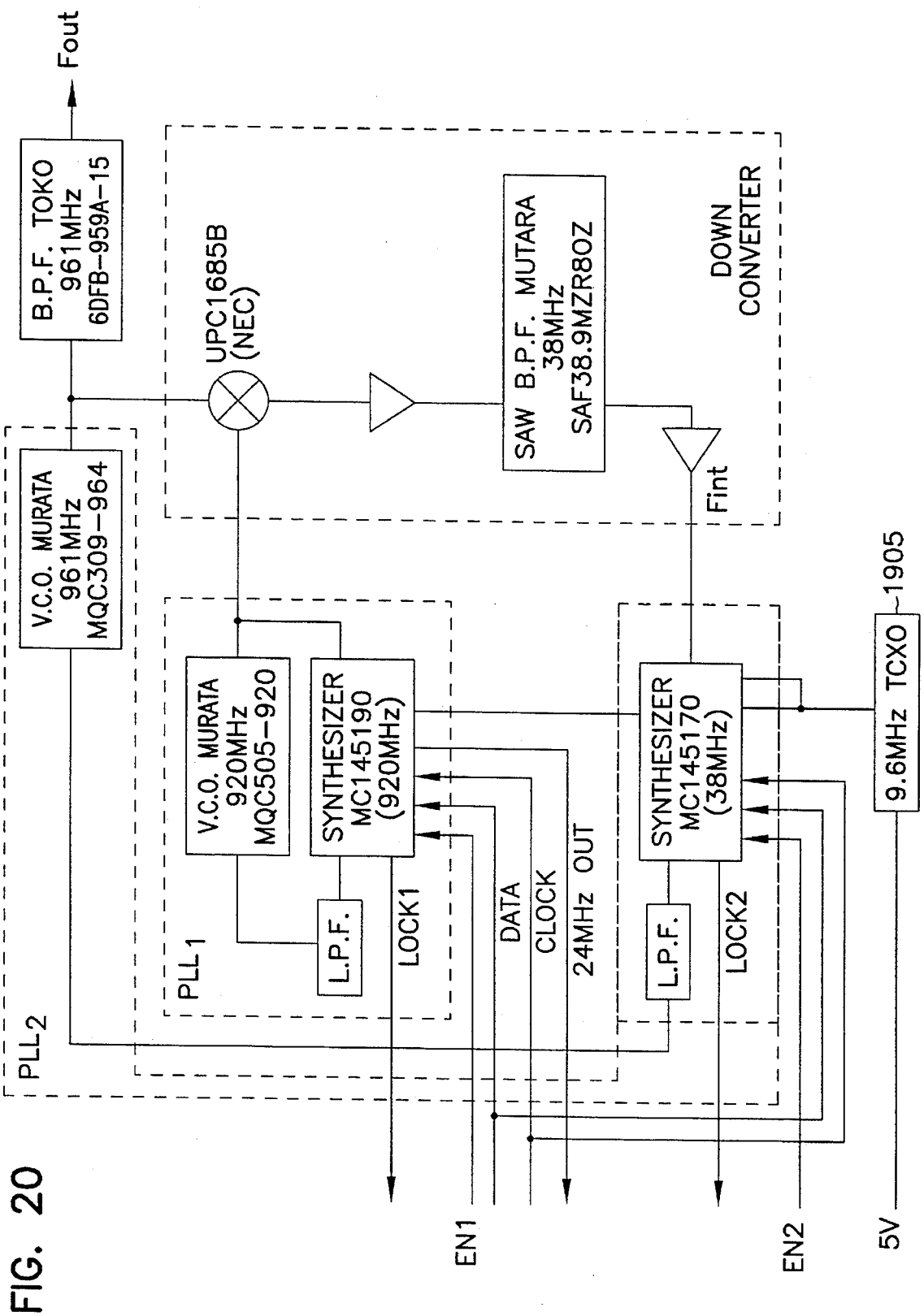
FIG. 20 is a detailed block diagram of the double loop PLL frequency low phase noise synthesizer of FIG. 19.

The double phase lock loop synthesizer (DPLL) shown in FIG. 19 and generally diagrammed in FIG. 20 includes an inner loop PLL, PLL1 1950 (shown in a dashed box of FIG. 19) which provides a frequency of $F_{out}-F_{int}$, a down converter 1952, which converts the output frequency to $F_{int}$ and a second PLL (PLL2) 1951 which locks on $F_{int}$ and controls the VCO 1908 which provides $F_{out}$. Note that the frequencies shown in the example illustration of FIG. 20 are by way of example only and not by way of limitation.

This DPLL design reduces the noise of the output frequency substantially. In general, PLL1 1950 generates a coarse resolution frequency so that the division ratio is low. PLL2 1951 locks on the low frequency also to provide a low division ratio. A band pass filter 1916 is provided to reject the PLL1 frequency that leaks back through the mixer 1912. A single 9.6 megahertz reference 1905 having an accuracy of 3 parts per million is used as the same reference frequency for both PLL1 and PLL2.

The double loop PLL design in FIG. 19 includes two synthesizer chips for each PLL. Synthesizer chip 1918 of PLL1 is in the preferred embodiment a 1.1 gigahertz PLL frequency synthesizer, Part No. MC145190 available from Motorola Semiconductors, Phoenix, Ariz. This frequency synthesizer, referenced to the 9.6 megahertz reference frequency 1905, generates a local oscillator signal of approximately 860 megahertz. This PLL synthesizer chip 1918 produces a locked stable output signal which is low pass filtered to produce a variable voltage to control voltage control oscillator 1915. VCO 1915 is in the preferred embodiment, Part No. MQC505-900 operating at approximately 860 megahertz and available from Murata of Tokyo, Japan. The feedback through sense 1914 keeps synthesizer chip 1918 stable to produce a stable, fixed output which is the coarse frequency of the double loop design.

The second PLL 1952 produces a fine control frequency. PLL2 1951 includes synthesizer chip 1906 which is in the preferred embodiment of the present invention, Part No. MC145170 available from Motorola Semiconductor of Phoenix, Ariz. This is a PLL frequency synthesizer chip with digital controls for control by microcontroller 1903 which is very similar to synthesizer chip 1918. Synthesizer chip 1906 produces the fine control frequency which is programmable by microcontroller 1903. Frequency synthesizer chip 1906 adjusts the output frequency depending upon the frequency of the hop transmitted at the current time by the reverse paging unit of FIG. 19. By adjusting the fine frequency, which would be mixed with the coarse frequency, the output frequency in the 900 megahertz band is produced with very little phase noise, very little phase jitter and extremely narrow noise skirt.

The output of synthesizer chip 1906 is low pass filtered to produce a variable DC voltage to control VCO 1908. Voltage control oscillator 1908 is in the preferred embodiment Part No. MQC309-964 operating within the 900 megahertz band to provide the final output frequency. The output frequency from VCO 1908 is sensed from sense 1909 as one input to mixer 1912. The coarse frequency adjustment from PLL1 of approximately 860 megahertz is mixed with the final output frequency by mixer 1912 to produce a down converted fine adjustment frequency within down converter 1952. The fine adjust frequency is band pass filtered with an SAW band pass filter with a center frequency of approximately 38 megahertz. Band pass filter 1916 is in the preferred embodiment Part No. SAF38.9MZR80Z also available from Murata of Tokyo, Japan.

The output from band pass filter 1916 is the $F_{int}$ frequency used for the fine frequency control of synthesizer chip 1906. In this fashion, the feedback carefully controls the output frequency of synthesizer chip 1906 to ensure accurate frequency reproduction exactly or near the center of the required hop frequency.

The output of VCO 1908 of PLL2 1951 is mixed with the BPSK modulation data through mixer 1910. The BPSK modulation data is output from microcontroller 1903 to adjust the phase of the final output carrier frequency in mixer 1910. The final output frequency is buffered by a 1 watt power amplifier 1911 and transmitted by antenna 1921.

DPLL Frequency Selection

The DPLL design shown in FIG. 19 operates to synthesize accurate narrow frequencies by using a beat frequency generated as a result of mixing the outputs of PLL1 and PLL2 as the error signal for PLL2. The selected output frequency from VCO 1908 is determined by the output frequency from synthesizer chip 1951 which in turn is determined by the division of the 9.6 MHz reference frequency by the beat frequency produced by mixer 1921. Synthesizer 1951 is programmed to select the output frequency based on a modulo division of the beat frequency to accurately control the frequency selected by controller 1903. The resulting frequency has a resolution of 7.5 kHz.

PLL1 operates with a resolution of 480 Hz determined by dividing the 9.6 MHz reference frequency by 20. PLL2 operates with a resolution of 37.5 kHz determined by dividing the 9.6 MHz reference frequency by 256. The output frequency $F_{out}$ is computed as follows:

$$F_{out} = F_1 + F_{int} = F_{ref} * (N_1/M_1 + N_2/M_2)$$

where $$F_1 = F_{ref} * N_1/M_1$$

$$F_{int} = F_{ref} * N_2/M_2$$

and where $F_1$, $N_1$, and $M_1$ are parameters of PLL1, and where $F_{int}$, $N_2$, and $M_2$ are parameters of PLL2, and where N is the synthesizer divisor for the internal PLL for dividing the output frequency and M is the synthesizer divisor for the internal PLL for dividing the reference frequency.

Alternate Applications

The present reverse paging system is easily adapted to applications where low power, low data rate transmissions are required. For example, location of an injured or missing individual or tracking the location of an individual could be accomplished by placing the pager in auto-acknowledge mode where the pager continuously updates the base station. In this application, the transmit RF energy could also be used to locate the person by tracking the continuous acknowledgement energy from the pager.

The present invention may also be used as a medical alert device. Similar to the tracking application described above, a person in need of assistance may be located. To facilitate the location of a person in need of medical attention, the pager would need to continuously transmit or periodically transmit quite frequently. To ensure non-interference or collisions with other pagers with the group, the base station would move the active medical alert pager to its own group.

The present invention may also be used in a polling mode where response is automatic and not user generated. By connecting the remote units to perform monitoring of utilities, for example, the base station would poll the remote units to report utility usage. Also, remote monitoring of vending machines to provide accounting and status is an anticipated application of the present technology.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. A method of transmitting frequency-hopped spread spectrum data from a remote unit of a reverse paging system, comprising the steps of:

receiving periodic synchronization information;

continually monitoring a local repeating pseudo-random code sequence;

synchronizing the local repeating pseudo-random code sequence to the periodic synchronization information and for selecting a frequency hopping sequence based upon the repeating pseudo-random code sequence;

inputting the data to be transmitted as a plurality of bits of digital data;

encoding the bits of digital data using an error correction scheme to produce a larger number of encoded bits of digital data;

dividing the encoded bits of digital data into groups of encoded bits of digital data;

duplicating the groups of encoded bits of digital data to produce redundant groups of encoded bits of digital data;

interleaving the redundant groups of encoded bits of digital data to produce a plurality of interleaved redundant groups of encoded bits of digital data; and modulating and serially transmitting each of the plurality of interleaved redundant groups of encoded bits of digital data onto a series of hop frequencies of a frequency-hopped carrier in synchrony with the repeating pseudo-random code sequence.

2. A method of decoding the plurality of interleaved redundant groups of encoded bits of digital data of claim 1, comprising the steps of:

receiving each of the series of hop frequencies of the frequency-hopped carrier, each hop frequency containing one of the plurality of interleaved redundant groups of encoded bits of digital data;

determining the signal to noise ratio of each of the hop frequencies;

de-interleaving the interleaved redundant groups of encoded bits of digital data to re-produce the plurality of redundant groups of encoded bits of digital data;

tabulating individual bits of the redundant groups of encoded bits of digital data to produce table of a plurality of values representing the individual groups;

weighting each entry in the table of the plurality of values representing the individual groups by the signal to noise ratio of each of the hop frequencies to which each individual bit corresponds to produce weighted values for each of the individual bits; and decoding the digital value of each of the weighted values for each of the individual bits.

* * * * *